United States Patent
Okano et al.

(10) Patent No.: US 9,804,320 B2
(45) Date of Patent: Oct. 31, 2017

(54) ILLUMINATION DEVICE WITH EDGE-LIT LIGHT GUIDE WITH OPPOSED LIGHT SOURCES

(71) Applicant: SHARP KABUSHIKI KAISHA, Osaka-shi, Osaka (JP)

(72) Inventors: Masanobu Okano, Osaka (JP); Ken Sumitani, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 148 days.

(21) Appl. No.: 14/405,666

(22) PCT Filed: Jun. 5, 2013

(86) PCT No.: PCT/JP2013/065599
§ 371 (c)(1),
(2) Date: Dec. 4, 2014

(87) PCT Pub. No.: WO2013/183675
PCT Pub. Date: Dec. 12, 2013

(65) Prior Publication Data
US 2015/0138831 A1    May 21, 2015

(30) Foreign Application Priority Data

Jun. 8, 2012  (JP) .................... 2012-131405
Dec. 3, 2012  (JP) .................... 2012-264462

(51) Int. Cl.
G02F 1/13357    (2006.01)
F21V 8/00       (2006.01)
G02F 1/1335     (2006.01)

(52) U.S. Cl.
CPC ........ *G02B 6/0068* (2013.01); *G02B 6/0021* (2013.01); *G02B 6/0031* (2013.01);
(Continued)

(58) Field of Classification Search
CPC .. F21K 2200/20; F21K 9/52; F21Y 2103/003; G02B 6/0073; G02B 6/0091;
(Continued)

(56) References Cited

U.S. PATENT DOCUMENTS 2,712,593 A * 7/1955 Merchant .............. G01D 11/28
                                                    116/287
3,561,145 A * 2/1971 Shotwell .............. G02B 6/0026
                                                   362/23.15
(Continued)

FOREIGN PATENT DOCUMENTS

JP    9-231822 A    9/1997
JP    10-39299 A    2/1998
(Continued)

OTHER PUBLICATIONS

International Search Report, issued in PCT/JP2013/065599, dated Sep. 17, 2013.
(Continued)

*Primary Examiner* — Ismael Negron
(74) *Attorney, Agent, or Firm* — Birch, Stewart, Kolasch & Birch, LLP

(57) ABSTRACT

A light guide plate includes a plurality of LED light sources emitting light into two opposed side surfaces of the light guide plate, such that LED light sources having a length shorter than each of the opposed side surfaces at which the plurality of LED light sources are provided.

29 Claims, 24 Drawing Sheets

(52) U.S. Cl.
CPC ......... *G02B 6/0078* (2013.01); *G02F 1/1336* (2013.01); *G02B 6/0055* (2013.01); *G02B 6/0061* (2013.01)

(58) Field of Classification Search
CPC ....... G02F 1/133615; G09F 2013/1804; G09F 2013/1831
See application file for complete search history.

(56) References Cited

U.S. PATENT DOCUMENTS

| | | | | | |
|---|---|---|---|---|---|
| 4,714,983 | A | * | 12/1987 | Lang | G02B 6/0021 349/65 |
| 4,975,808 | A | * | 12/1990 | Bond | G02B 6/0021 362/23.16 |
| 5,070,431 | A | * | 12/1991 | Kitazawa | G02B 6/0021 362/23.15 |
| 5,136,483 | A | * | 8/1992 | Schoniger | F21S 48/1159 362/231 |
| 5,381,309 | A | * | 1/1995 | Borchardt | G02B 6/0013 362/23.15 |
| 5,528,709 | A | * | 6/1996 | Koike | G02B 6/0041 362/612 |
| 5,542,201 | A | * | 8/1996 | Grondal | G02B 6/0055 362/800 |
| 6,036,328 | A | * | 3/2000 | Ohtsuki | G02B 6/0021 362/582 |
| 6,966,684 | B2 | * | 11/2005 | Sommers | G02B 6/0036 362/559 |
| 8,585,237 | B2 | * | 11/2013 | Kim | G02B 6/0055 362/224 |
| 8,702,295 | B2 | * | 4/2014 | Lin | G02B 6/0083 362/612 |
| 2009/0185394 | A1 | | 7/2009 | Takahashi | |
| 2010/0259470 | A1 | | 10/2010 | Kohtoku et al. | |

FOREIGN PATENT DOCUMENTS

| | | |
|---|---|---|
| JP | 10-83711 A | 3/1998 |
| JP | 10-293213 A | 11/1998 |
| JP | 2004-333859 A | 11/2004 |
| JP | 2009-81096 A | 4/2009 |
| JP | 2010-39299 A | 2/2010 |
| JP | 2012-48964 A | 3/2012 |
| JP | 2012-69504 A | 4/2012 |
| JP | 2012-74404 A | 4/2012 |
| JP | 2012-89291 A | 5/2012 |
| WO | WO 2008/007487 A1 | 1/2008 |
| WO | WO 2009/110145 A1 | 9/2009 |

OTHER PUBLICATIONS

Written Opinion of the International Searching Authority, issued in PCT/JP2013/065599, dated Sep. 17, 2013.

* cited by examiner

30: Surface light source device
120: Light guide plate
130: Reflecting sheet
131: Reflecting member
140a: LED light source substrate
140b: LED light source substrate
150: Diffusing sheet
160: Housing 130: Reflecting sheet
131: Reflecting member
132: Notch 120: Light guide plate
131: Reflecting member
140a: LED light source substrate
140b: LED light source substrate
610: Wiring board
620: LED package
630: Reflecting sheet fixing member 120: Light guide plate
131: Reflecting member
140a: LED light source substrate
140b: LED light source substrate
141: Small substrate 120: Light guide plate
131: Reflecting member
140a: LED light source substrate
140b: LED light source substrate
141: Small substrate 100: LED light source device
120: Light guide plate
130: Reflecting sheet
140: LED light source substrate
150: Diffusing sheet
160: Housing 100: LED light source device
120: Light guide plate
130: Reflecting sheet
140: LED light source substrate
150: Diffusing sheet
160: Housing 600: LED light source substrate
601: Connector
610: Wiring board
620: LED package 611: Base
612: Wiring layer
613: Solder resist layer
621: LED element
622: Sealing resin
623: Bonding wire
624: Wiring layer
625: Base
626: Solder 500: LED light source substrate
511: Base
512: Connector
513: Wiring layer
514: Sealing resin
515: LED element
516: Bonding wire 500: LED light source substrate
511: Base
512: Connector
513: Wiring layer
514: Sealing resin
515: LED element
516: Bonding wire

140

121 ⎫
122 ⎭ 120

120: Light guide plate
121: Light guide body
122: Reflection pattern
140: LED light source substrate 120: Light guide plate
140a: LED light source substrate
140b: LED light source substrate 120: Light guide plate
140a: LED light source substrate
140b: LED light source substrate 120: Light guide plate
140: LED light source substrate 120: Light guide plate
140: LED light source substrate 20: Illumination device
120: Light guide plate
130: Reflecting sheet
140a: LED light source substrate
140b: LED light source substrate
150: Diffusing sheet
160: Housing 20: Illumination device
120: Light guide plate
130: Reflecting sheet
140a: LED light source substrate
140b: LED light source substrate
150: Diffusing sheet
160: Housing

US 9,804,320 B2

ILLUMINATION DEVICE WITH EDGE-LIT LIGHT GUIDE WITH OPPOSED LIGHT SOURCES

TECHNICAL FIELD

The present invention relates to an edge light-type surface light source device and an illumination device.

BACKGROUND ART

An edge light-type surface light source device which employs a light guide plate is widely used, mainly as a backlight device for a liquid crystal display.

It has become mainstream to employ the edge light-type surface light source device as a backlight device for a liquid crystal display, since the edge light-type surface light source device, in which a linear light source is provided at an edge of the light guide plate and linear light emitted from the linear light source is converted by the light guide plate into planar light, is more effective in reducing a thickness of a backlight device module for the liquid crystal display or of a product to which the backlight device module is applied, as compared with a direct backlight device which uses no light guide plate and a light source of which is disposed directly below a liquid crystal panel (see, for example, Patent Literature 1). Further, the edge light-type surface light source device is used for illumination in some cases.

Conventionally, it was mainly a cold cathode fluorescent lamp (CCFL) that was used as a light-emitting source of these light source devices, but in recent years, the cold cathode fluorescent lamp is increasingly replaced by a light-emitting diode (LED). The replacement enables to (i) abolish the use of environmentally-unfriendly mercury which is used in a CCFL or a fluorescent lamp, (ii) reduce power consumption, (iii) enhance color reproducibility, and (iv) lengthen the lives of the light source devices.

The following description will discuss, with reference to FIGS. 14 through 25, a conventional edge light-type surface light source device. FIG. 14 is an exploded perspective view illustrating an arrangement of a conventional edge light-type surface light source device. FIG. 15 is a cross-sectional view of the conventional edge light-type surface light source device illustrated in FIG. 14 and illustrates a state in which the conventional edge light-type surface light source device is assembled.

As illustrated in FIGS. 14 and 15, a LED light source device 100, which is a conventional edge light-type surface light source device, includes a housing 160, a light guide plate 120, a reflecting sheet 130, a diffusing sheet 150, and an LED light source substrate 140.

Note that in a case where the light guide plate 120 is relatively thin, the light guide plate 120 may be called a light guide sheet. Choice between the term light guide plate and the term light guide sheet is idiomatic, and there is no rigid distinction between the terms. The member called 'light guide plate 120' here denotes a light guide section in general, including a member called a light guide sheet.

The LED light source substrate 140 emits light to be applied to the light guide plate 120. The light applied from the LED light source substrate 140 enters an inside of the light guide plate 120 through an incident surface of the light guide plate 120, the incident surface being a side surface of the light guide plate 120. The light having entered the light guide plate 120 through the incident surface is subjected to mixing and homogenization inside the light guide plate 120 so as to be turned into planar light and emitted from a top surface of the light guide plate 120, the top surface being an irradiation surface of the light guide plate 120.

The reflecting sheet 130 is provided on a rear surface side (on an opposite side of the irradiation surface) of the light guide plate 120, and contributes to improvement of light use efficiency by causing light leaking to the rear surface side to travel back into the light guide plate.

The diffusing sheet 150 is provided on a front surface side (on a side of the irradiation surface) of the light guide plate 120, and has an effect of reducing luminance unevenness by homogenizing light emitted to the front surface side. The diffusing sheet 150 is used in combination with various other optical sheets (e.g., a lens sheet, a polarized light reflecting sheet, and the like), if necessary.

The housing 160 houses the above-described members such that the members are fixed and supported inside the housing 160.

By having the above-described arrangement, the LED light source device 100 serves as a surface irradiation device which uses light emission from the LED light source substrate 140.

Next, the following description will discuss, with reference to FIGS. 16 through 19, a specific arrangement of an LED light source substrate included in a conventional edge light-type surface light source device.

FIG. 16 shows an outer appearance of an LED light source substrate included in a conventional edge light-type surface light source device. FIG. 17 is a cross-sectional view of the LED light source substrate illustrated in FIG. 16.

As illustrated in FIG. 16, an LED light source substrate 600 is constituted by a flat wiring board 610, a plurality of LED packages 620 mounted on the flat wiring board 610, and a connector 601 also mounted on the flat wiring board 610. The plurality of LED packages 620 are electrically connected to the outside (not shown) via the connector 601 and a harness (not shown), and this arrangement allows light emission from the LED packages 620 to be externally controlled.

With reference to FIG. 17, a structure around each of the plurality of LED packages 620 will be described in further detail.

The wiring board 610 is constituted by a base 611, a wiring layer 612, and a solder resist layer 613 which are stacked on top of one another. An LED package 620 is connected to and fixed onto the wiring layer 612 by use of solder 626.

The LED package 620 includes an LED element 621, sealing resin 622, a bonding wire 623, a wiring layer 624, and a base 625. The LED element 621 is mounted on the base 625, and is connected to the wiring layer 624 by means of the bonding wire 623. The sealing resin 622 seals an inside of the base 625 to thereby protect parts inside the base 625 and connection between the parts. Further, the sealing resin 622 can contain phosphor, so that a color of light emitted from the LED element 621 can be changed. For example, an LED package emitting white light can be provided by using a blue LED element and yellow phosphor. The wiring layer 624 connects between (i) a portion of the LED package 620 which portion is connected to the solder 626 and (ii) a portion of the LED package 620 to which portion the LED element 621 is wire-bonded.

In the example illustrated in FIG. 17, the wiring layer 624 has a shape penetrating through the base 625, the solder 626 is connected to a portion of the wiring layer 624 which portion is on a bottom surface side of the base 625, and the LED element 621 is connected to a portion of the wiring layer 624 which portion is on a top surface side of the base 625.

The arrangement illustrated in FIG. 17 allows the LED element 621 to be electrically connected with the outside (not shown) via the wiring board 610, the connector 601, and the harness (not shown) while being fixed structurally. This allows light emission by the LED element 621 to be controlled externally.

FIG. 18 is another example of an LED light source substrate included in a conventional edge light-type surface light source device. FIG. 19 is a cross-sectional view of the LED light source substrate illustrated in FIG. 18, taken along a line indicated by an arrow A-A of FIG. 18. An LED light source substrate 500 illustrated in FIGS. 18 and 19 is arranged such that LED elements 515 are mounted on a base 511 by COB (Chip On Board) without using an LED package. That is, the LED elements 515 are directly mounted on the base 511. The base 511 can be provided with another layer (e.g., a wiring layer 513) on a surface of the base 511, and in this case, the LED elements 515 can be mounted on a surface of the another layer. In any case, according to COB, the LED elements 515 are directly mounted as they are onto the wiring board, instead of being stored in a package and indirectly mounted on the wiring board.

The base 511 has a front surface (a surface of the base 511 which surface horizontally extends and is located the closest to the top side of the sheet of in FIG. 19) and concave sections which are recessed from the front surface. The LED elements 515 are mounted within the concave sections.

In the LED light source substrate 500, the wiring layer 513 is electrically connected to the LED elements 515 via a bonding wire 516. Further, although not shown, the wiring layer 513 is electrically connected to an electrode terminal included in the connector 512. According to this arrangement, light emission from the LED elements 515 can be controlled by electrically controlling a harness (not shown) connected to the connector 512.

The LED elements 515, the bonding wire 516, and portions where the LED elements 515 are connected to the boding wire 516 are easily broken when an impact is applied. In order to prevent the breakage, the LED elements 515, the bonding wire 516, and the connection portions are sealed with sealing resin 514. That is, the concave sections are filled with the sealing resin 514. This arrangement allows the LED elements 515 and the bonding wire 516 to not only withstand a certain degree of externally applied impact but also be protected from water, a foreign matter, and the like.

Further, a color tone of light emitted from the LED light source substrate 515 can be adjusted by adding a colorant or phosphor to the sealing resin 514. For example, in a case where the LED elements 515 emit blue-colored light or ultraviolet rays and the sealing resin 514 contains suitable phosphor, the LED light source substrate 515 can emit white light.

Designing the LED light source substrate 140 to be constituted by LED packages and a wiring board as in the LED light source substrate 600 has such advantages that (i) a relatively large-sized substrate can be easily manufactured since an outer shape can be formed by pressing or routering and (ii) the LED packages can be mounted with use of a generally used mounter. On the other hand, mounting LED elements by COB as in the LED light source substrate 500 has such advantages that (i) the lack of a need to use solder in the mounting process eliminates temperature restrictions which may otherwise be imposed due to soldering temperatures at the time of using the solder and (ii) since the LED light source substrate can be manufactured into its final form by the same process as that for manufacturing an LED package, the LED light source substrate can be manufactured at low cost provided that the LED light source substrate has a small size.

FIG. 20 is a view illustrating a pattern of reflection of light in a conventional edge light-type surface light source device. In FIG. 20, light emitted from the LED light source substrate 140 enters the light guide plate 120 through the incident surface (a left side which is shown on the left on the sheet of FIG. 20) of the light guide plate 120. The light guide plate 120 is constituted by a light guide body 121 and reflection patterns 122.

In FIG. 20, a representative trace of incident light is indicated by arrows. Light emitted from the LED light source substrate 140 and applied to the incident surface of the light guide body 121 (i) enters an inside of the light guide body 121 while being refracted, in a case where an incident angle of the light is smaller than a certain degree and (ii) is totally reflected by the incident surface instead of entering the inside of the light guide body 121, in a case where the incident angle is larger than the certain degree.

The incident light having entered the light guide body 121 is repeatedly totally reflected by a top surface and a bottom surface of the light guide body 121. When the incident light hits a reflection pattern 122, the incident light is reflected so as to be diffused, so that many components are emitted from the top surface, i.e., an exit surface.

Normally, the reflection patterns 122 are set appropriately in order to achieve a homogenous emission pattern of surface light, a desired emission pattern of surface light, etc. For example, in order to achieve a homogenous emission pattern, the reflection patterns 122 are set so that a density of the reflection patterns is high at a position far away from the light source ((i) each reflection pattern is large, (ii) the number of reflection patterns per area is large, (iii) a combination of (i) and (ii), or the like), whereas the density of the reflection patterns is low at a position near the light source ((i) each reflection pattern is small, (ii) the number of reflection patterns per area is small, (iii) a combination of (i) and (ii), or the like).

The light guide body 121 is often made of a material such as an acrylic resin which has a very high transmittance, or polycarbonate which has a relatively high transmittance and a high strength. In particular, in a surface light source module having a relatively large size, the light guide body 121 is often made of acrylic resin, since an amount of light which is lost by being absorbed by the light guide plate is considerable in such a surface light source module. In contrast, in a case where the light guide body 121 has a relatively small size and requires strength, the light guide body 121 is often made of polycarbonate.

The reflection pattern 122 can be added to the light guide body 121 by, for example, laser marking the light guide body 121 or applying a coating material to the light guide body 121, or can be realized as a shape that is formed at the same time as molding the light guide body 121.

The following description will discuss, with reference to FIGS. 21 through 24, a positional arrangement of a light source substrate in a conventional edge light-type surface light source device. Each of FIGS. 21 through 24 schematically illustrates a positional arrangement of a light source substrate in a conventional edge light-type surface light source device.

In the example illustrated in FIG. 21, an LED light source substrate 140*a* and an LED light source substrate 140*b* are provided at respective ones of a pair of long sides (an upper side and a lower side which are shown at the top and the bottom, respectively, on the sheet of FIG. 21) of the light guide plate 120. Each of the LED light source substrate 140*a* and the LED light source substrate 140*b* has a length equal to that of a corresponding one of the pair of long sides of the light guide plate 120.

In the example illustrated in FIG. 22, an LED light source substrate 140*a* and an LED light source substrate 140*b* are provided at respective ones of a pair of short sides (a left side and a right side which are shown on the left and the right, respectively, on the sheet of FIG. 22) of the light guide plate 120. Each of the LED light source substrate 140*a* and the LED light source substrate 140*b* has a length equal to that of a corresponding one of the pair of short sides of the light guide plate 120.

In the example illustrated in FIG. 23, an LED light source substrate 140 is provided at one long side (a lower side which is shown at the bottom on the sheet of FIG. 23) of the light guide plate 120. The LED light source substrate 140 has a length equal to that of the one long side of the light guide plate 120.

In the example illustrated in FIG. 24, an LED light source substrate 140 is provided at one short side (a left side which is shown on the left on the sheet of FIG. 24) of the light guide plate 120. The LED light source substrate 140 has a length equal to that of the one short side of the light guide plate 120.

Note here that a total length of a light source substrate can be made shorter by providing the light source substrate at a short side of the light guide plate than providing the light source substrate at a long side of the light guide plate. Further, a total length of a light source substrate can be made shorter by providing the light source substrate at one side of the light guide plate than providing the light source substrate at two sides of the light guide plate.

For example, a total length of a light source substrate can be made shorter in the arrangement illustrated in FIG. 22 than in the arrangement illustrated in FIG. 21. Further, a total length of a light source substrate can be made shorter in the arrangement illustrated in FIG. 23 than in the arrangement illustrated in FIG. 21. Further, a total length of a light source substrate can be made shorter in the arrangement illustrated in FIG. 24 than in the arrangement illustrated in FIG. 22.

In general, reducing a total length of a light source substrate has many advantages such as a reduction in production cost, a reduction in weight of the product, a reduction of environmental burdens achieved by a reduction in volume of the members used, and a reduction in transportation cost which is achieved by a reduction in size and weight.

However, even in a case where the arrangement illustrated in FIG. 24 which enables the greatest reduction in total length of a light source substrate is employed, a length of the light source substrate needs to be equal to that of a corresponding side. This is because it is necessary to meet a demand for a light guide plate having as homogenous a luminance as possible, and the demand can be easily met by designing a light source substrate to have a length equal to that of a corresponding side. That is, in the case where the arrangement illustrated in FIG. 24 is employed, setting the length of the light source substrate shorter than that of the corresponding side may cause the light guide plate to have a portion having an insufficient luminance.

This issue will be described specifically with reference to FIG. 25. FIG. 25 is a view illustrating an irradiation area (irradiation region) which is irradiated with light from a light source substrate in a conventional surface light source device in which the light source substrate is provided at one side of a light guide plate. FIG. 25 illustrates an example in which the LED light source substrate 140 having a length shorter than that of one short side of the light guide plate 120 is experimentally provided at the one short side in a conventional surface light source device.

As illustrated in FIG. 25, in the conventional surface light source device, light emitted from the LED light source substrate 140 travels toward a right side of the light guide plate 120, and an irradiation area 210*a* which is irradiated with the light extends toward an upper side of the light guide plate 120 so as to form an angle α of refraction and extends toward a lower side of the light guide plate 120 so as to form an angle α of refraction.

This is because the light emitted from the LED light source substrate 140 is refracted by a side surface (i.e., a boundary surface) of the light guide plate 120. Accordingly, as shown in FIG. 25, a dark portion (a portion not indicated by hatching) which is not irradiated with the light from the LED light source substrate 140 is formed at each of an upper left corner section and a lower left corner section of the light guide plate 120.

In a case where the length of the LED light source substrate 140 is thus made shorter than that of the corresponding side, light can be directly applied to the irradiation area 210*a* but cannot be directly applied to the dark portion. This prevents the light guide plate in the conventional surface light source device to have a sufficient luminance. Therefore, the length of the LED light source substrate 140 cannot be designed shorter than that of the corresponding short side in the conventional surface light source device.

Even if the length of the LED light source substrate 140 is not designed shorter, an entire region of the light guide plate 120 in an original size can be an irradiation area by extending a length of a long side of the light guide plate 120. However, it is normally unacceptable that an extended portion of the long side exceeds 10% of a length of a short side of the light guide plate 120.

For example, in a case where the light guide plate 120 is made of an acrylic resin (refractive index: 1.49), the light will have a critical angle α of approximately 42°. Some types of optical glass have a refractive index lower than 1.49, for example, approximately 1.43, and in this case, the critical angle α is approximately 45°. In this case, if the length of the LED light source substrate 140 is less than 0.8 times the length of the corresponding short side, the length of the extended portion of the long side undesirably exceeds 10% of the length of the short side. Therefore, it is very difficult to set the length of the LED light source substrate 140 to be not more than 0.8 times the length of the corresponding short side.

However, there is still a demand for designing a length of a light source substrate to be shorter than that of a corresponding side. Conventionally, in order to meet the demand, art for setting a length of a light source substrate to be shorter than that of a corresponding side has been devised.

For example, Patent Literature 2 below discloses an arrangement in which, a length of a light source is shorter than that of a short side of a light guide plate, while an illumination light introduction section is provided so that illumination light emitted from the light source is widened by the illumination light introduction section so as to be guided to the light guide plate.

Further, Patent Literature 3 below discloses an arrangement in which, a length of a light source is shorter than that of a short side of a light guide plate, while a light scattering hole is formed in the light guide plate so that light is diffused in the light guide plate.

Furthermore, Patent Literatures 4 and 5 below each disclose an arrangement in which an L-shaped light source is provided at a corner section of a light guide plate, so that both a homogenous display luminance and a reduction in power consumption of the light source is achieved.

Further, Patent Literatures 6 and 7 each disclose an arrangement related to an illumination device employing an edge light-type surface light source device.

CITATION LIST

Patent Literatures

Patent Literature 1
Japanese Patent Application Publication, Tokukai, No. 2010-039299 A (Publication Date: Feb. 18, 2010)
Patent Literature 2
Japanese Patent Application Publication, Tokukaihei, No. 09-231822 A (Publication Date: Sep. 5, 1997)
Patent Literature 3
Japanese Patent Application Publication, Tokukaihei, No. 10-293213 A (Publication Date: Nov. 4, 1998)
Patent Literature 4
Japanese Patent Application Publication, Tokukaihei, No. 10-039299 A (Publication Date: Feb. 13, 1998)
Patent Literature 5
Japanese Patent Application Publication, Tokukaihei, No. 10-083711 A (Publication Date: Mar. 31, 1998)
Patent Literature 6
Japanese Patent Application Publication, Tokukai, No. 2012-69504 A (Publication Date: Apr. 5, 2012)
Patent Literature 7
Japanese Patent Application Publication, Tokukai, No. 2012-74404 A (Publication Date: Apr. 12, 2012)

SUMMARY OF INVENTION

Technical Problem

However, according to the art disclosed in Patent Literature 2, the necessity to provide an illumination light introduction section between the light source and the light guide plate increases not only cost but also a size of the surface light source device due to a space required for the illumination light introduction section at an edge section of the light guide plate. Moreover, an incident angle at which light enters the light guide plate is increased, so that an efficiency of incidence of light into the light guide plate is decreased.

Further, the art disclosed in Patent Literature 3 requires the light scattering hole to be formed in the light guide plate, and a process of forming the light scattering hole involves a high level of difficulty in shaping. This leads to a significant increase in cost.

Further, according to the art disclosed in each of Patent Literatures 4 and 5, a length of the light source substrate can be shortened with use of a generally used light guide plate, but a furthest corner from the light source which is provided in an L shape is far away from both the sides of the light source and has a decreased luminance, accordingly. This poses a limit on achieving homogenous irradiation. As such, it is necessary to either (i) decrease an overall luminance in accordance with the luminance of the furthest corner or (ii) carry out inhomogeneous irradiation in which, for example, the corner section is relatively dark.

Furthermore, the art disclosed in each of Patent Literatures 4 and 5 invites an increase in cost since it is necessary to use the light source having the L shape, which is a complicated shape. Further, since the light source is provided practically at both a long side and a short side of the light guide plate, it is not possible to reduce a space for a side section of one of the long side and the short side.

According to the art related to the illumination device disclosed in each of Patent Literatures 6 and 7, a length of an LED light source substrate is substantially equal to a length of a light entry section of a light guide plate to which the LED light source substrate is provided.

The present invention is accomplished in view of the problems described above. An object of the present invention is to provide (i) an edge light-type surface light source device which enables to both secure a sufficient irradiation area which is irradiated with light emitted from a light source and reduce a length of a light-emitting portion of the light source and (ii) an illumination device to which the edge light-type surface light source device is applied.

Solution to Problem

In order to attain the object, an edge light-type surface light source device of the present invention is an edge light-type surface light source device, including: a light guide section; and a plurality of light sources each emitting light into the light guide section through a side surface of the light guide section, the plurality of light sources (i) being provided at a pair of sides of the light guide section, the pair of sides facing each other and (ii) including respective light-emitting portions, the longest one of which has a length shorter than a length of each of the pair of sides at which the plurality of light sources are provided.

Further, an edge light-type surface light source device of the present invention is an edge light-type surface light source device including: a light guide section; and a plurality of light sources each emitting light into the light guide section through a side surface of the light guide section, the plurality of light sources (i) being provided at a pair of sides of the light guide section, the pair of sides facing each other and (ii) including respective light-emitting portions, a total of lengths of the respective light-emitting portions being shorter than a length of each of the pair of sides at which the plurality of light sources are provided.

Further, an edge light-type surface light source device of the present invention is an edge light-type surface light source device, including: a light guide section having a substantially polygonal shape which is not a rectangular shape; and a plurality of light sources each emitting light into the light guide section through a side surface of the light guide section, the plurality of light sources (i) being provided at a pair of sides of the light guide section, the pair of sides not being adjacent to each other and (ii) including respective light-emitting portions, the longest one of which has a length shorter than a length of each of the pair of sides at which the plurality of light sources are provided.

Further, an edge light-type surface light source device of the present invention is an edge light-type surface light source device including: a light guide section having a shape of a part of a substantially circular shape or a substantially oval shape; and a plurality of light sources each emitting light into the light guide section through a side surface of the light guide section, the light guide section including a flat section or a notch in an arc part of the substantially circular shape or the substantially oval shape, at least a part of the plurality of light sources being arranged along the flat section or the notch.

Advantageous Effects of Invention

The present invention makes it possible to provide an edge light-type surface light source device and an illumination device each of which enables to both secure a sufficient irradiation area which is irradiated with light emitted from a light source and reduce a length of a light-emitting portion of the light source.

DESCRIPTION OF EMBODIMENTS

The following description will discuss, with reference to drawings, embodiments of the present invention. The same reference sign will be given to identical members, and description on such members may not be repeated.

First Embodiment

Figure 1:
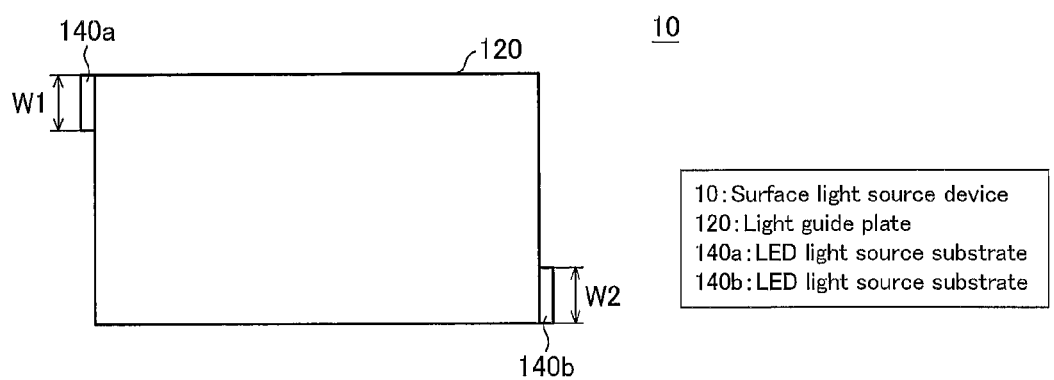
FIG. 1 schematically illustrates an arrangement of a surface light source device according to a First Embodiment of the present invention.
Figure 2:
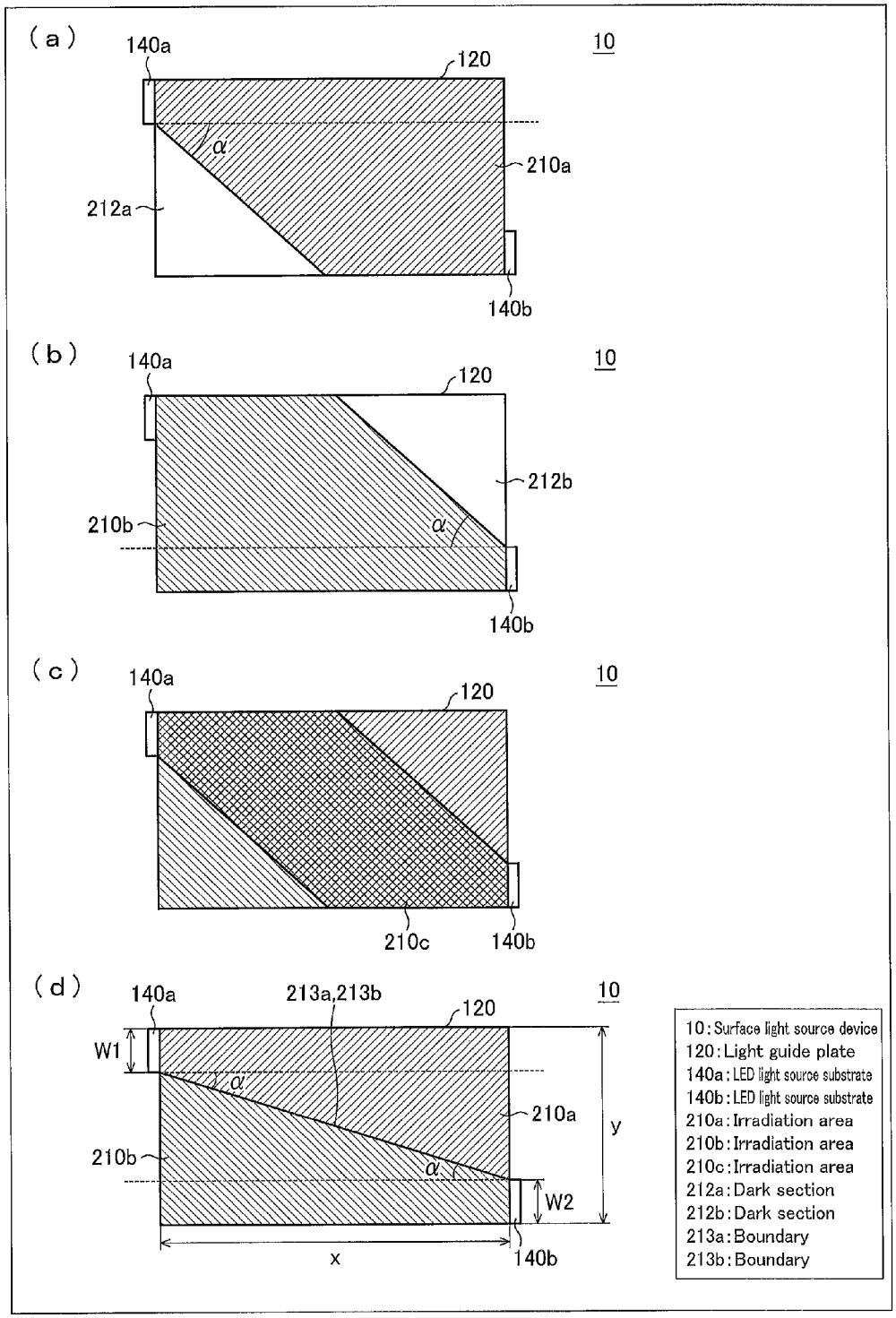
FIG. 2 illustrates irradiation areas which are irradiated with light from respective LED light source substrates in the surface light source device according to the First Embodiment of the present invention.

First, with reference to FIGS. 1 and 2, the following description will discuss a surface light source device 10 of a First Embodiment as an example of an edge light-type surface light source device according to the present invention.

(Arrangement of Surface Light Source Device)

FIG. 1 schematically illustrates an arrangement of the surface light source device 10 according to the First Embodiment of the present invention. The surface light source device 10 illustrated in FIG. 1 includes a light guide plate 120 and LED light source substrates 140a and 140b. The surface light source device 10 is what is called an edge light-type surface light source device, and arranged such that the LED light source substrates 140a and 140b provided at side surfaces of the light guide plate 120 apply light to an inside of the light guide plate 120 through the side surfaces.

The light guide plate 120 has a horizontally long rectangular shape corresponding to a shape of a liquid crystal display panel which is provided in a display device together with the light guide plate 120. As shown in FIG. 1, the rectangular shape is constituted by (i) a pair of short sides facing each other (a left side and a right side which are shown on the left and the right, respectively, on the sheet of FIG. 1) and (ii) a pair of long sides facing each other (an upper side and a lower side which are shown on the top and the bottom, respectively, on the sheet of FIG. 1).

In the surface light source device 10, each of the pair of short sides is provided with an LED light source substrate. Specifically, the LED light source substrate 140a is disposed at the left side of the light guide plate 120, and the LED light source substrate 140b is disposed at the right side of the light guide plate 120.

It is particularly notable that the LED light source substrate 140a is provided at an upper end section of the left side, whereas the LED light source substrate 140b is provided at a lower end section of the right side. That is, the LED light source substrate 140a is provided in the vicinity of an upper left corner section of the light guide plate 120, whereas the LED light source substrate 140b is provided in the vicinity of a lower right corner section of the light guide plate 120.

Further, it is notable that a length W1 of a light-emitting portion of the LED light source substrate 140a and a length W2 of a light-emitting portion of the LED light source substrate 140b are very short, and a total of the lengths W1 and W2 of the light-emitting portions of the two LED light source substrates is shorter than a length of one of the short sides of the light guide plate 120. This is because disposing the two LED light source substrates as described above makes it possible to secure a sufficient irradiation area in the light guide plate 120 without increasing the length of the light-emitting portion of each of the LED light source substrates any more.

(Areas Irradiated with Light)

FIG. 2 illustrates irradiation areas which are irradiated with light from respective LED light source substrates in the surface light source device 10 according to the First Embodiment of the present invention. Specifically, (a) of FIG. 2 shows an irradiation area 210a irradiated with light from the LED light source substrate 140a, (b) of FIG. 2 shows an irradiation area 210b irradiated with light from the LED light source substrate 140b, and (c) of FIG. 2 shows irradiation areas irradiated with light from the respective LED light source substrates 140a and 140b.

(Area Irradiated with Light from LED Light Source Substrate 140a)

As shown in (a) of FIG. 2, in the surface light source device 10 of the present embodiment, light emitted from the LED light source substrate 140a travels toward the right side of the light guide plate 120, and the irradiation area 210a irradiated with the light extends toward a lower side of the light guide plate 120 so as to form an angle α of refraction. This is because the light emitted from the LED light source substrate 140a is refracted by the side surface (that is, a boundary surface) of the light guide plate 120. As a result, as shown in (a) of FIG. 2, a dark section 212a (a portion not indicated by hatching) which is not irradiated with the light from the LED light source substrate 140a is formed at a lower left corner section of the light guide plate 120.

Note here that the light guide plate 120 has a refractive index λ of greater than one (1). As such, the angle α of refraction formed by a normal line and a refracted lay is smaller than 90°.

A relationship between the refractive index λ and the angle α of refraction can be represented by the following formula (1).

$$\sin \alpha = 1/\lambda \quad (1)$$

(Irradiation Area Irradiated with Light from LED Light Source Substrate 140b)

As shown in (b) of FIG. 2, in the surface light source device 10 of the present embodiment, light emitted from the LED light source substrate 140b travels toward the left side of the light guide plate 120, and the irradiation area 210b irradiated with the light extends toward the upper side of the light guide plate 120 so as to form an angle α of refraction. As a result, a dark section 212b (a portion not indicated by hatching) which is not irradiated with the light from the LED light source substrate 140b is formed at an upper right corner section of the light guide plate 120.

(Area Irradiated with Light from LED Light Source Substrates 140a and 140b)

(c) of FIG. 2 shows the irradiation area 210a and the irradiation area 210b so that the irradiation area 210a and the irradiation area 210b overlap with each other. In (c) of FIG. 2, an irradiation area 210c indicated by a third hatching is a region in which the irradiation area 210a and the irradiation area 210b overlap with each other.

As shown in (a) and (b) of FIG. 2, when a state where only the LED light source substrate 140a is turned on and a state where only the LED light source substrate 140b is turned on are individually considered, the dark section 212a and the dark section 212b are present in the respective states. In contrast, as shown in (c) of FIG. 2, in a state where both the LED light source substrates 140a and 140b are turned on, the dark section 212a and the dark section 212b are canceled out by the irradiation area 210b and the irradiation area 210a, respectively, in the light guide plate 120. Accordingly, an entire region of the light guide plate 120 becomes an irradiation area.

(Advantageous Effects of the Present Embodiment)

As described above, although the surface light source device 10 of the present embodiment employs the LED light source substrates each including a light-emitting portion having a very small length, a sufficient irradiation area which is irradiated with light can be secured in the light guide plate 120, due to the special positional arrangement of the LED light source substrates as described above.

Note that in a case where lengths of the sides of the light guide plate 120 and a refractive index λ of the light guide plate 120 are different from those described in the present embodiment, a length of the light-emitting portion of at least one of the LED light source substrate 140*a* and the LED light source substrate 140*b* can be changed, as necessary, so that an entire region of the light guide plate 120 becomes an irradiation area as in the present embodiment.

In this case, it is possible to make an entire region of the light guide plate 120 an irradiation area by satisfying the following formula (2):

$$L + x/\sqrt{(\lambda^2 - 1)} \geq y \quad (2)$$

where x is a length of a long side of the light guide plate 120, y is a length of a short side of the light guide plate 120, and L is a sum of a length of the LED light source substrate 140*a* and a length of the LED light source substrate 140*b*.

In order to describe the formula (2) in further detail, (d) of FIG. 2 shows an example case in which the inequality sign in the formula (2) is replaced with an equality sign, that is, a case where the irradiation area 210*c* where an irradiation region irradiated with light emitted from the LED light source substrate 140*a* and an irradiation region irradiated with light emitted from the LED light source substrate 140*b* overlap with each other is zero (0) but an entire region of the light guide plate 120 can be covered by the irradiation regions 210*a* and 210*b* respectively irradiated with the light emitted from the LED light source substrate 140*a* and the light emitted from the LED light source substrate 140*b*. In the example case, (i) the formula (2) is satisfied and (ii) L, which is the sum of a length of the LED light source substrate 140*a* and a length of the LED light source substrate 140*b*, has a smallest value.

As illustrated in (d) of FIG. 2, in the example case, a boundary 213*a* of the irradiation region 210*a* irradiated with the light emitted from the LED light source substrate 140*a* and a boundary 213*b* of the irradiation region 210*b* irradiated with the light emitted from the LED light source substrate 140*b* coincide on the same straight line along an angle α of refraction that satisfies the formula (1).

At this time, as illustrated in (d) of FIG. 2, a relation represented by the following formula (2') holds among the lengths W1 and W2 of the respective LED light source substrates 140*a* and 140*b* and the length y of a short side of the light guide plate 120.

$$W1 + x \times \tan(\alpha) + W2 = y \quad (2')$$

Note here that since (i) W1+W2 is as described above, (ii) L is the sum of the length of the LED light source substrate 140*a* and the length of the LED light source substrate 140*b*, and (iii) an angle α of refraction is an angle that satisfies the formula (1), if the formula (2') is rewritten with use of the refractive index λ of the light guide plate and L, the formula (2') corresponds to a case where the inequality sign in the formula (2) is replaced with an equality sign.

In a case where the left-hand side of the formula (2') is greater than the right-hand side (y: a length of a short side of the light guide plate 120) of the formula (2'), the irradiation area 210*c* in which the irradiation regions irradiated with the light emitted from the respective LED light source substrates 140*a* and 140*b* overlap with each other is increased.

For example, the boundary 213*a* moves downward in a case where the length of the LED light source substrate 140*a* increases from the state illustrated in (d) of FIG. 2, whereas the boundary 213*b* moves upward in a case where the length of the LED light source substrate 140*b* increases from the state illustrated in (d) of FIG. 2. As such, in a case where the length of at least one of the LED light source substrates 140*a* and 140*b* increases from this state, the irradiation region 210*c* in which the irradiation region 210*a* and the irradiation region 210*b* overlap with each other is formed, as illustrated in (c) of FIG. 2.

Note that the length of the light-emitting portion (the length of at least one of the LED light source substrates 140*a* and 140*b*) can be made shorter in some cases. For example, any L can meet the formula (2) in a case where (i) the light guide plate 120 is constituted by an acrylic resin (λ=1.49) and (ii) an aspect ratio of the light guide plate 120 is 9:16, which is a ratio usually employed in a liquid crystal TV or the like. That is, the length of the light-emitting portion can be made as short as possible.

Further, the surface light source device 10 of the present embodiment can have a relatively enhanced luminance at each corner section of the light guide plate 120.

For example, since the LED light source substrate 140*a* is provided at the upper left corner section of the light guide plate 120, the surface light source device 10 can have an enhanced luminance at the upper left corner section as a matter of course, and also have an enhanced luminance at the upper right corner section located in a direction perpendicular to the LED light source substrate 140*a*. This is because light emitted from a linear LED light source substrate in a direction perpendicular to the linear LED light source substrate has a strong intensity.

Similarly, since the LED light source substrate 140*b* is provided at the lower right corner section of the light guide plate 120, the surface light source device 10 can have an enhanced luminance at the lower right corner section as a matter of course, and also have an enhanced luminance at the lower left corner section of the light guide plate 120 located in a direction perpendicular to the LED light source substrate 140*b*.

Further, in the surface light source device 10 of the present embodiment, the LED light source substrates 140*a* and 140*b* are located point-symmetric to each other with respect to the light guide plate 120, and reflection patterns of light in the light guide plate 120 are also point-symmetric to each other. As such, the surface light source device 10 can be incorporated in a liquid crystal display panel or the like in a state where the surface light source device 10 is rotated by 180°. This enhances productivity at the time of incorporating the surface light source device 10 of the present embodiment into the liquid crystal display panel or the like. In this case, it is preferable that LED light source substrates identical to each other be used as the LED light source substrates 140*a* and 140*b*. This provides advantageous effects such as a reduction in parts cost.

Second Embodiment

Figure 3:
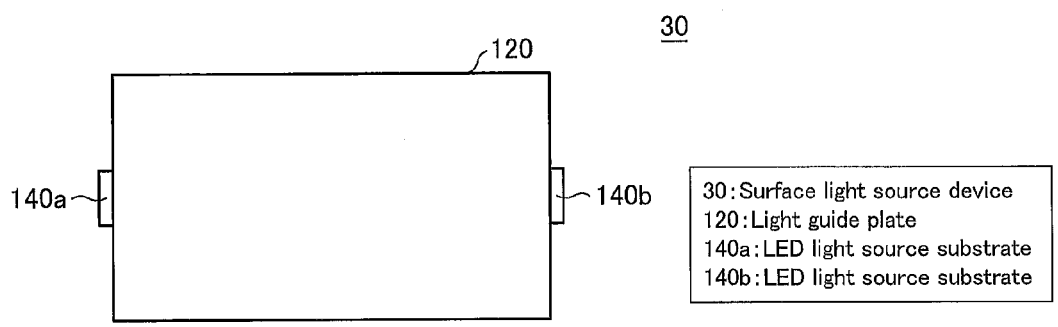
FIG. 3 schematically illustrates an arrangement of a surface light source device according to a Second Embodiment of the present invention.
Figure 4:
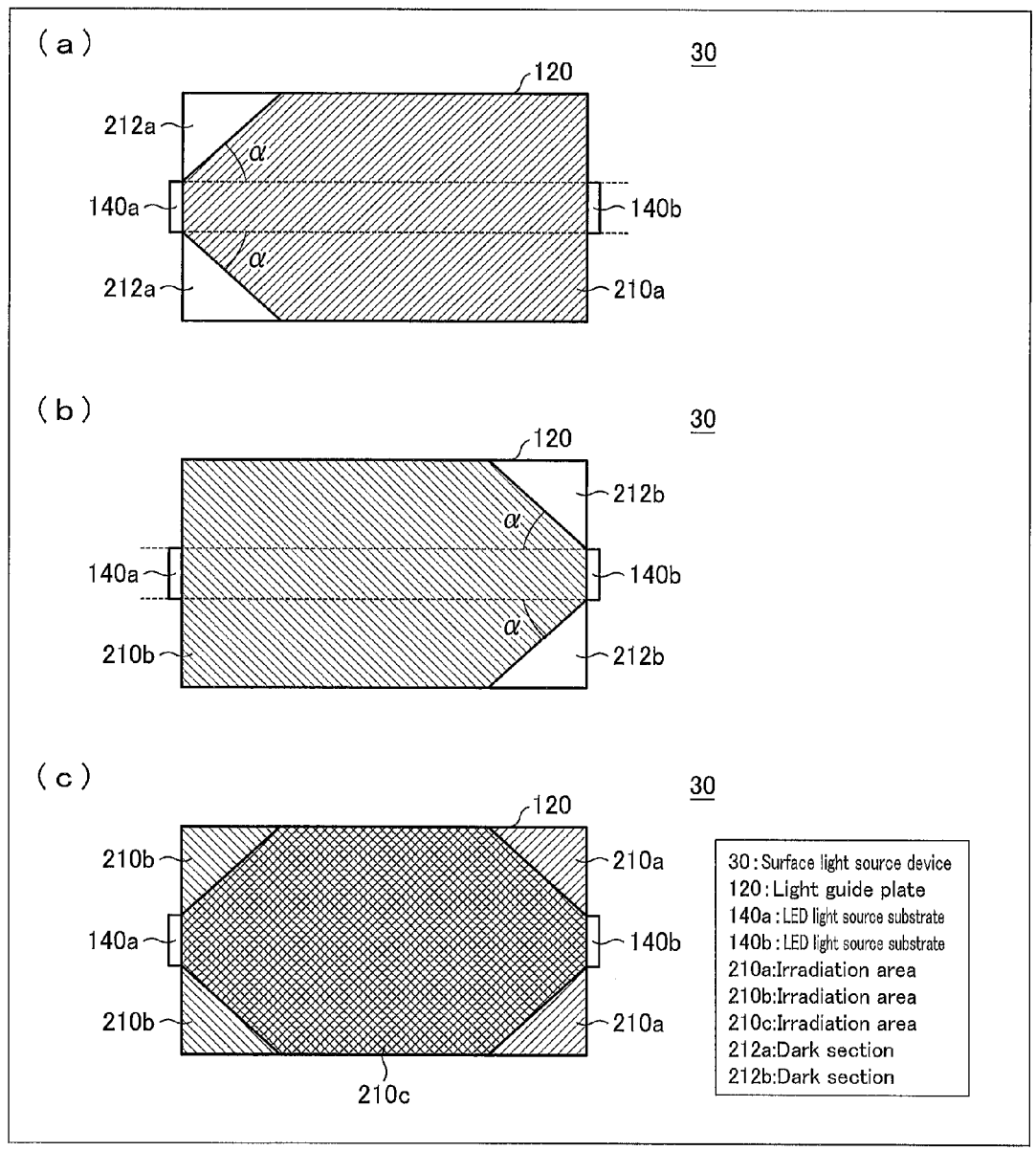
FIG. 4 illustrates irradiation areas which are irradiated with light from respective LED light source substrates in the surface light source device according to the Second Embodiment of the present invention.

Next, the following description will discuss, with reference to FIGS. 3 and 4, a surface light source device 30 according to a Second Embodiment, which is an example of the edge light-type light source substrate according to the present invention.

FIG. 3 schematically illustrates an arrangement of the surface light source device 30 according to the Second Embodiment of the present invention. The surface light source device 30 of the Second Embodiment is similar to the surface light source device 10, except for a positional arrangement of each LED light source substrate.

Specifically, as illustrated in FIG. 3, the surface light source device 30 of the Second Embodiment is arranged such that (i) an LED light source substrate 140a is provided at a central section of a left side of a light guide plate 120, and (ii) an LED light source substrate 140b is provided at a central section of a right side of the light guide plate 120.

FIG. 4 illustrates irradiation areas which are irradiated with light from the respective LED light source substrates in the surface light source device 30 according to the Second Embodiment of the present invention. Specifically, (a) of FIG. 4 shows an irradiation area 210a irradiated with light from the LED light source substrate 140a, (b) of FIG. 4 shows an irradiation area 210b irradiated with light from the LED light source substrate 140b, and (c) of FIG. 4 shows irradiation areas irradiated with light from the respective LED light source substrates 140a and 140b.

As shown in (a) of FIG. 4, in the surface light source device 30 of the present embodiment, light emitted from the LED light source substrate 140a travels toward a right side of the light guide plate 120, and the irradiation area 210a irradiated with the light extends toward an upper side of the light guide plate 120 so as to form an angle α of refraction, and extends toward a lower side of the light guide plate 120 so as to form an angle α of refraction. As a result, a dark section 212a which is not irradiated with the light from the LED light source substrate 140a is formed at a lower left corner section of the light guide plate 120.

Further, as shown in (b) of FIG. 4, in the surface light source device 30 of the present embodiment, light emitted from the LED light source substrate 140b travels toward the left side of the light guide plate 120, and the irradiation area 210b irradiated with the light extends toward the upper side of the light guide plate 120 so as to form an angle α of refraction, and extends toward the lower side of the light guide plate 120 so as to form an angle α of refraction. As a result, a dark section 212b which is not irradiated with the light from the LED light source substrate 140b is formed at each of an upper right corner section and a lower right corner section of the light guide plate 120.

Also in the surface light source device 30 of the present embodiment, as shown in (a) and (b) of FIG. 4, when a state where only the LED light source substrate 140a is turned on and a state where only the LED light source substrate 140b is turned on are individually considered, the dark section 212a and the dark section 212b are present in the respective states. In contrast, as shown in (c) of FIG. 4, in a state where both the LED light source substrates 140a and 140b are turned on, the dark section 212a and the dark section 212b are canceled out by the irradiation area 210b and the irradiation area 210a, respectively, in the light guide plate 120. Accordingly, an entire region of the light guide plate 120 becomes an irradiation area.

That is, although the surface light source device 30 of the present embodiment also employs the LED light source substrates each including a light-emitting portion having a very small length, a sufficient irradiation area which is irradiated with light can be secured in the light guide plate 120, due to the special positional arrangement of the LED light source substrates as described above.

Like the surface light source device 10, the surface light source device 30 can also emit light from an entire region of the light guide plate 120 by means of short LED light source substrates. In particular, according to the surface light source device 30, it is possible to form, on the light guide plate 120, irradiation patterns which are vertically and horizontally symmetric to each other and therefore look natural to a viewer.

Figure 25:
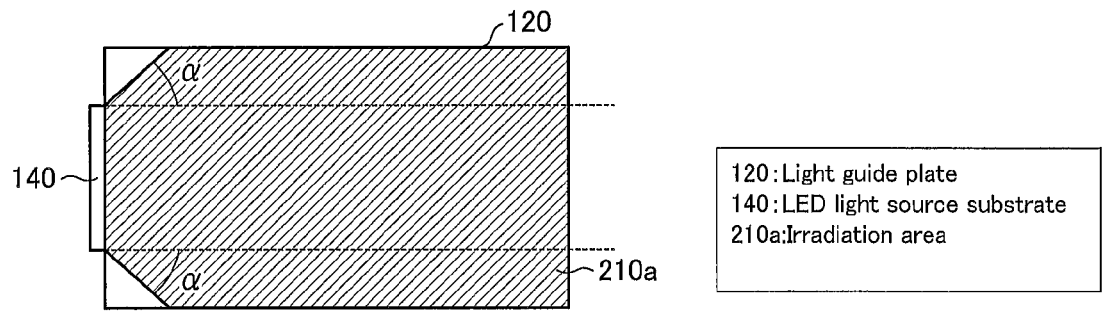
FIG. 25 is a view illustrating an irradiation area which is irradiated with light from a light source substrate in a conventional surface light source device in which the light source substrate is provided at one side of a light guide plate.

As described above, in the conventional art (see FIG. 25), a required length of an extended portion of the light guide plate 120 exceeds 10% of a length of a short side of the light guide plate 120 in a case where a length of the LED light source substrate 140 is shorter than 0.8 times the length of the short side of the light guide plate 120. In contrast, in the surface light source device 30 of the present embodiment, even in a case where a length of the LED light source substrate 140 is less than 0.8 times a length of a short side of the light guide plate 120, a length of an extended portion is sufficiently less than 10% of the length of the short side of the light guide plate 120, and moreover, the length of the extended portion can be set to zero (0) as well.

Third Embodiment

Figure 5:
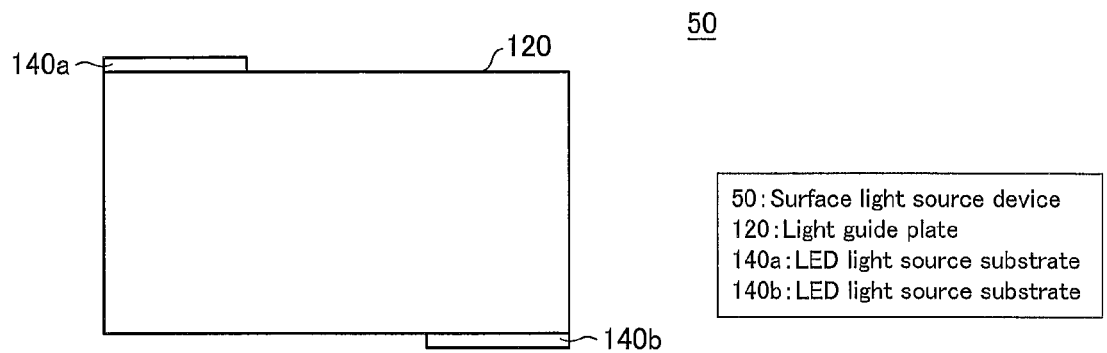
FIG. 5 schematically illustrates an arrangement of a surface light source device according to a Third Embodiment of the present invention.
Figure 6:
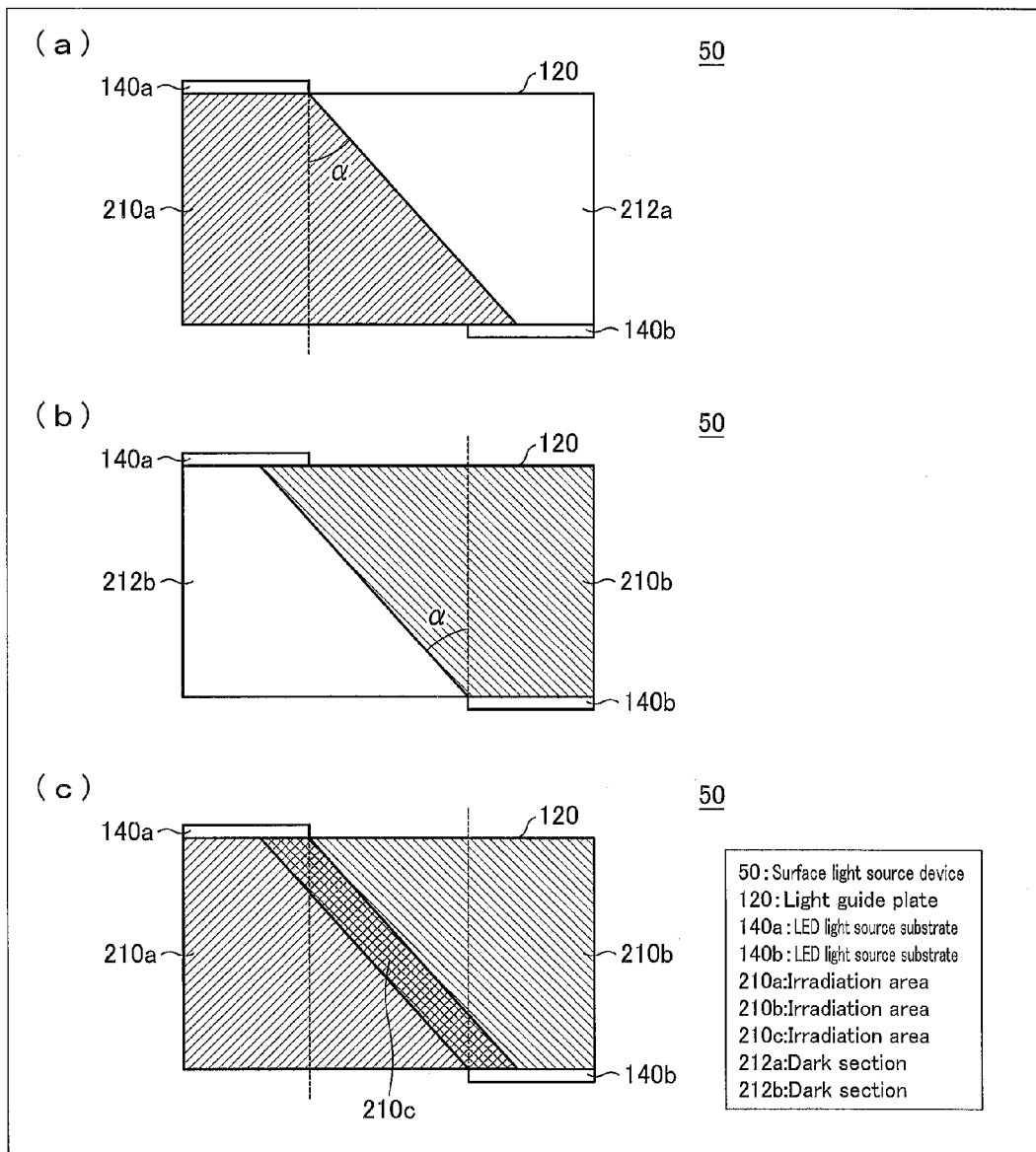
FIG. 6 illustrates irradiation areas which are irradiated with light from respective LED light source substrates in the surface light source device according to the Third Embodiment of the present invention.

Next, the following description will discuss, with reference to FIGS. 5 and 6, a surface light source device 50 according to a Third Embodiment, which is an example of the edge light-type light source substrate according to the present invention.

FIG. 5 schematically illustrates an arrangement of the surface light source device 50 according to the Third Embodiment of the present invention. The surface light source device 50 of the Third Embodiment is similar to each of the surface light source devices 10 and 30, except for a positional arrangement of each LED light source substrate.

Specifically, as illustrated in FIG. 5, the surface light source device 50 of the Third Embodiment is arranged such that (i) an LED light source substrate 140a is provided at a left end section of an upper side of a light guide plate 120, and (ii) an LED light source substrate 140b is provided at a right end section of a lower side of the light guide plate 120. That is, in the surface light source device 50 of the Third Embodiment, an LED light source substrate is provided at each of a pair of long sides of the light guide plate 120.

FIG. 6 illustrates irradiation areas which are irradiated with light from the respective LED light source substrates in the surface light source device 30 according to the Third Embodiment of the present invention. Specifically, (a) of FIG. 6 shows an irradiation area 210a irradiated with light from the LED light source substrate 140a, (b) of FIG. 6 shows an irradiation area 210b irradiated with light from the LED light source substrate 140b, and (c) of FIG. 6 shows irradiation areas irradiated with light from the respective LED light source substrates 140a and 140b.

As shown in (a) of FIG. 6, in the surface light source device 50 of the present embodiment, light emitted from the LED light source substrate 140a travels toward a lower side of the light guide plate 120, and the irradiation area 210a irradiated with the light extends toward a right side of the light guide plate 120 so as to form an angle α of refraction. As a result, a dark section 212a which is not irradiated with the light from the LED light source substrate 140a is formed at an upper left corner section of the light guide plate 120.

Further, as shown in (b) of FIG. 6, in the surface light source device 50 of the present embodiment, light emitted from the LED light source substrate 140b travels toward the upper side of the light guide plate 120, and the irradiation area 210b irradiated with the light extends toward a left side of the light guide plate 120 so as to form an angle α of refraction. As a result, a dark section 212b which is not irradiated with the light from the LED light source substrate 140b is formed at a lower left corner section of the light guide plate 120.

Also in the surface light source device 50 of the present embodiment, as shown in (a) and (b) of FIG. 6, when a state where only the LED light source substrate 140a is turned on and a state where only the LED light source substrate 140b is turned on are individually considered, the dark section 212a and the dark section 212b are present in the respective states. In contrast, as shown in (c) of FIG. 6, in a state where both the LED light source substrates 140a and 140b are turned on, the dark section 212a and the dark section 212b are canceled out by the irradiation area 210b and the irradiation area 210a, respectively, in the light guide plate 120. Accordingly, an entire region of the light guide plate 120 becomes an irradiation area.

That is, although the surface light source device 50 of the present embodiment also employs the LED light source substrates each including a light-emitting portion having a very small length, a sufficient irradiation area which is irradiated with light can be secured in the light guide plate 120, due to the special positional arrangement of the LED light source substrates as described above.

As described above, in a case where LED light source substrates are provided at long sides, it is possible to make an entire region of the light guide plate 120 an irradiation area by satisfying, like the formula (2) described in the First Embodiment, the following formula (3):

$$L+y/\sqrt{(\lambda^2-1)} \geq x \quad (3)$$

where x is a length of a long side of the light guide plate 120, y is a length of a short side of the light guide plate 120, and L is a sum of a length of the LED light source substrate 140a and a length of the LED light source substrate 140b.

For example, in a case where (i) the light guide plate 120 is constituted by an acrylic resin ($\lambda=1.49$) and (ii) an aspect ratio of the light guide plate 120 is 9:16, which is a ratio usually employed in a liquid crystal TV or the like, it is possible to make an entire region of the light guide plate 120 an irradiation area by satisfying the following formula (4).

$$L \geq 0.49x \quad (4)$$

That is, in a case where the sum of the length of the LED light source substrate 140a and the length of the LED light source substrate 140b is more than 0.49 times the length of the long side of the light guide plate 120, an entire region of the light guide plate 120 can be made an irradiation area.

According to the surface light source device 50 of the present embodiment, the LED light source substrates are provided along the long sides of the light guide plate. As such, a distance traveled by light from the LED light source substrate during a time where the light is applied to the light guide plate, passes through the light guide plate, and then is emitted from an irradiation surface of the light guide plate is relatively small. Accordingly, a relatively small amount of light is absorbed by the light guide plate, so that an improvement in light emitting efficiency is achieved.

Fourth Embodiment

Figure 7:
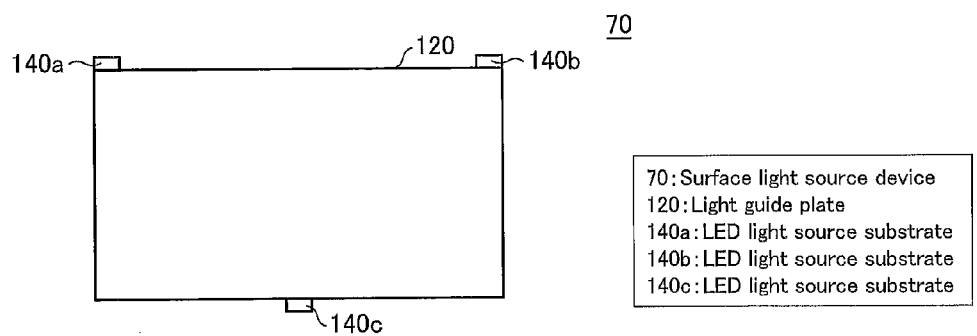
FIG. 7 schematically illustrates an arrangement of a surface light source device according to a Fourth Embodiment of the present invention.
Figure 8:
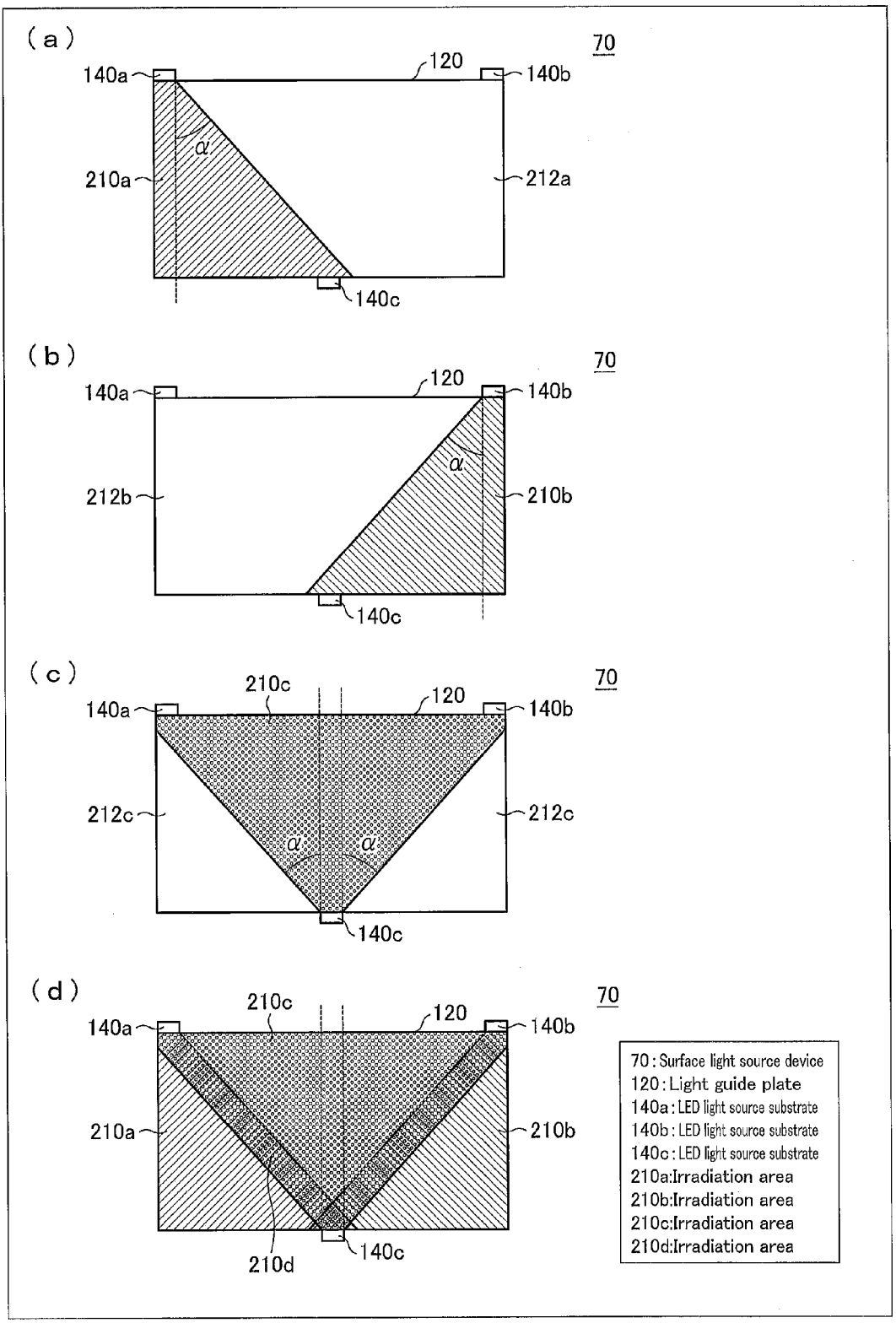
FIG. 8 illustrates irradiation areas which are irradiated with light from respective LED light source substrates in the surface light source device according to the Fourth Embodiment of the present invention.

Next, the following description will discuss, with reference to FIGS. 7 and 8, a surface light source device 70 according to a Fourth Embodiment, which is an example of the edge light-type light source substrate according to the present invention.

FIG. 7 schematically illustrates an arrangement of the surface light source device 70 according to the Fourth Embodiment of the present invention. The surface light source device 50 of the Fourth Embodiment is similar to each of the surface light source devices 10, 30, and 50, except for a positional arrangement of each LED light source substrate.

Specifically, as illustrated in FIG. 7, the surface light source device 70 of the Fourth Embodiment includes, as LED light source substrates, an LED light source substrate 140a, an LED light source substrate 140b, and an LED light source substrate 140c.

The LED light source substrate 140a is provided at a left end section of an upper side of the light guide plate 120, the LED light source substrate 140b is provided at a right end section of the upper side of the light guide plate 120, and the LED light source substrate 140c is provided at a central section of a lower side of the light guide plate 120.

That is, the surface light source device 70 of the Fourth Embodiment is different from each of the surface light source devices 10, 30, and 50 described above in that (i) three LED light source substrates are provided and (ii) two LED light source substrates are provided to a single long side (upper side) of the light guide plate 120.

FIG. 8 illustrates irradiation areas which are irradiated with light from the respective LED light source substrates in the surface light source device 70 according to the Fourth Embodiment of the present invention. Specifically, (a) of FIG. 8 shows an irradiation area 210a irradiated with light from the LED light source substrate 140a, (b) of FIG. 8 shows an irradiation area 210b irradiated with light from the LED light source substrate 140b, (c) of FIG. 8 shows an irradiation area 210c irradiated with light from the LED light source substrate 140c, and (d) of FIG. 8 shows irradiation areas irradiated with light from the respective LED light source substrates 140a, 140b, and 140c.

As shown in (a) of FIG. 8, in the surface light source device 70 of the present embodiment, light emitted from the LED light source substrate 140a travels toward the lower side of the light guide plate 120, and the irradiation area 210a irradiated with the light extends toward a right side of the light guide plate 120 so as to form an angle α of refraction. As a result, a dark section 212a which is not irradiated with the light from the LED light source substrate 140a is formed mainly at an upper right corner section of the light guide plate 120.

Further, as shown in (b) of FIG. 8, in the surface light source device 70 of the present embodiment, light emitted from the LED light source substrate 140b travels toward the lower side of the light guide plate 120, and the irradiation area 210b irradiated with the light extends toward a left side of the light guide plate 120 so as to form an angle α of refraction. As a result, a dark section 212b which is not irradiated with the light from the LED light source substrate 140b is formed mainly at an upper left corner section of the light guide plate 120.

Further, as shown in (c) of FIG. 8, in the surface light source device 70 of the present embodiment, light emitted from the LED light source substrate 140c travels toward the upper side of the light guide plate 120, and the irradiation area 210c irradiated with the light extends toward the left side of the light guide plate 120 so as to form an angle α of refraction, and extends toward the right side of the light guide plate 120 so as to form an angle α of refraction. As a result, a dark section 212c which is not irradiated with the light from the LED light source substrate 140b is formed at each of a lower left corner section and a lower right corner section of the light guide plate 120.

Also in the surface light source device 70 of the present embodiment, as shown in (a) through (c) of FIG. 8, when a state where only the LED light source substrate 140a is turned on, a state where only the LED light source substrate 140b is turned on, and a state where only the LED light source substrate 140c is turned on are individually considered, the dark sections 212a, 212b and 212c are present in the respective states. In contrast, as shown in (d) of FIG. 8, in a state where all of the LED light source substrates 140a, 140b, and 140c are turned on, the dark section 212a is canceled out by the irradiation areas 210b and 210c, the dark section 212b is canceled out by the irradiation areas 210a and 210c, and the dark section 212c is canceled out by the irradiation areas 210a and 210b, in the light guide plate 120. Accordingly, an entire region of the light guide plate 120 becomes an irradiation area.

That is, although the surface light source device 70 of the present embodiment also employs the LED light source substrates each including a light-emitting portion having a very small length, a sufficient irradiation area which is irradiated with light can be secured in the light guide plate 120, due to the special arrangements in number and position of the LED light source substrates as described above.

In particular, the surface light source device 70 of the present embodiment is designed so that each of the LED light source substrates is provided at appropriate positions as described above, in view of a shape in which the light emitted from each of the LED light source substrates extends. Accordingly, even though the surface light source device 70 employs only three LED light source substrates each including a light-emitting portion having an extremely small length, a sufficient irradiation area which is irradiated with light can be secured in the light guide plate 120. That is, as compared with the surface light source device 50 of the Third Embodiment, the surface light source device 70 of the present embodiment has one more extra LED light source substrate but a size of each of the LED light source substrates can be made extremely small.

This effect is clear from comparison between FIG. 6 illustrating irradiation areas of the surface light source device 50 and FIG. 8 illustrating irradiation areas of the surface light source device 70, but is also clear from the following description.

In a case where N LED light source substrates are provided at long sides, it is necessary to satisfy the following formula (5) as with the formula (2) described in the First Embodiment, in order to make an entire region of the light guide plate 120 an irradiation area.

$$L+(N-1)y/\sqrt{(\lambda^2-1)} \geq x \quad (5)$$

For example, the following considers a case in which the light guide plate 120 is constituted by an acrylic resin ($\lambda$=1.49) and has an aspect ratio of 9:16.

In the case of the surface light source device 50 of the Third Embodiment, N=2. In this case, L=0 does not satisfy the formula (5). That is, there is a limit to how much a sum total of lengths of the respective LED light source substrates can be reduced.

On the other hand, in the case of the surface light source device 50 of the present embodiment, N=3. In this case, L=0 satisfies the formula (5). That is, there is no limit to how much a sum total of lengths of the respective LED light source substrates can be reduced.

Fifth Embodiment

Figure 9:
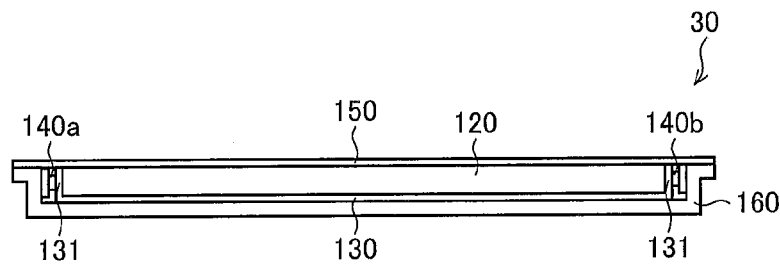
FIG. 9 is a cross-sectional view illustrating an arrangement of a surface light source device according to a Fifth Embodiment of the present invention.
Figure 10:
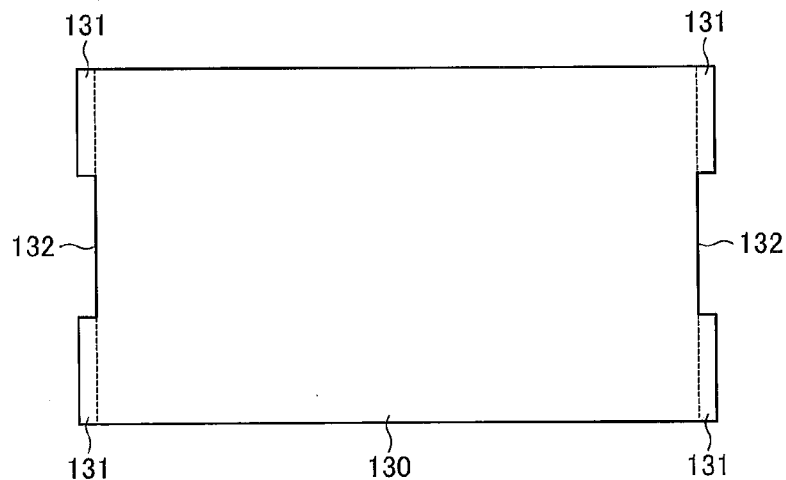
FIG. 10 illustrates arrangements of a reflecting sheet and a reflecting member included in the surface light source device according to the Fifth Embodiment of the present invention.
Figure 11:
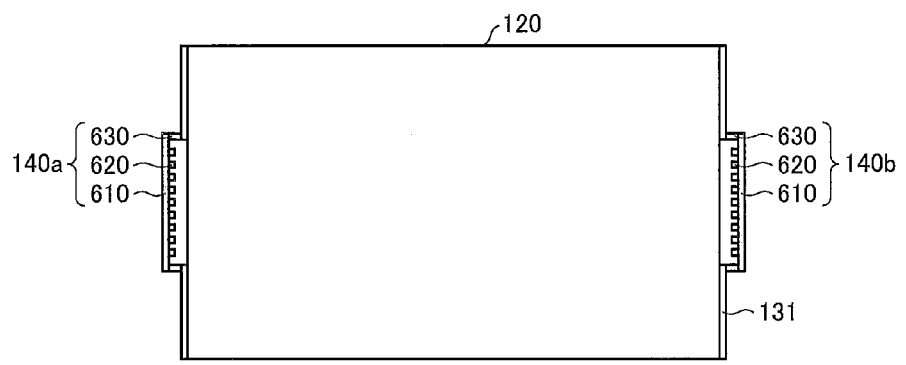
FIG. 11 illustrates an arrangement of a side portion of a light guide plate in the surface light source device according to the Fifth Embodiment of the present invention.

Next, the following description will discuss, with reference to FIGS. 9 through 11, a Fifth Embodiment of the present invention.

The surface light source device 30 described in the Second Embodiment has an arrangement in which the LED light source substrates are each provided at a center of a short side of the light guide plate 120. Accordingly, each of the corner sections of the light guide plate 120 may have a luminance lower than that of a portion other than the corner sections.

In view of this, the present embodiment described below deals with an example arrangement in which, while the surface light source device 30 of the Second Embodiment is used, the luminance of each of the corner sections of the light guide plate 120 is improved.

FIG. 9 is a cross-sectional view illustrating an arrangement of a surface light source device 30 according to a Fifth Embodiment of the present invention.

Figure 15:
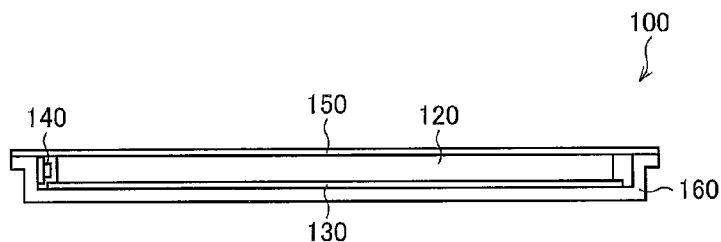
FIG. 15 is a cross-sectional view illustrating the conventional edge light-type surface light source device illustrated in FIG. 14, in a state where the conventional edge light-type surface light source device is assembled.
Figure 16:
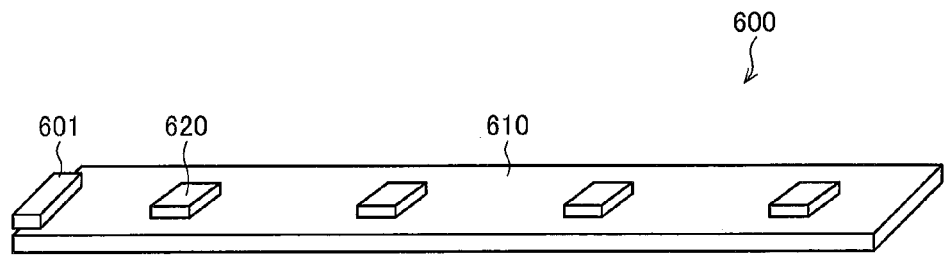
FIG. 16 illustrates an outer appearance of an LED light source substrate included in a conventional edge light-type surface light source device.
Figure 17:
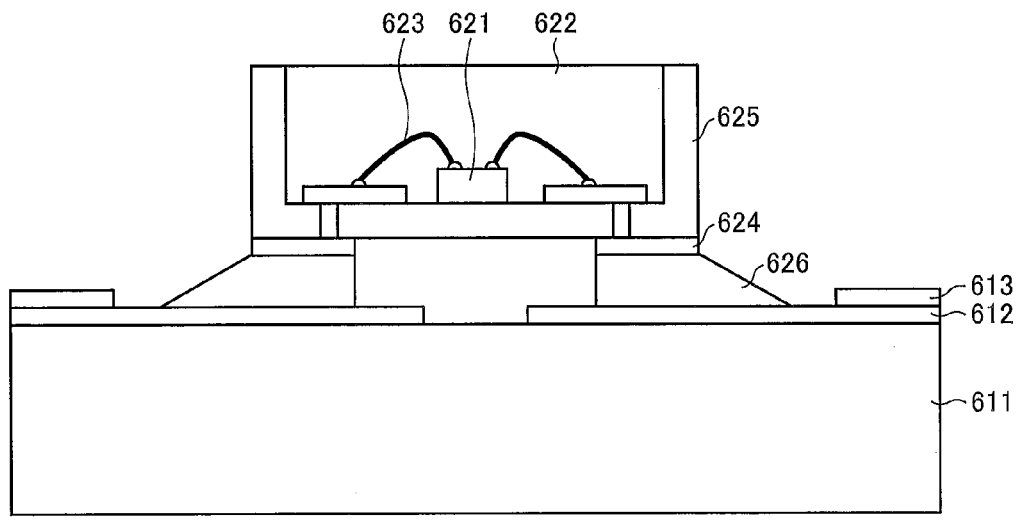
FIG. 17 is a cross-sectional view of the LED light source substrate illustrated in FIG. 16.
Figure 18:
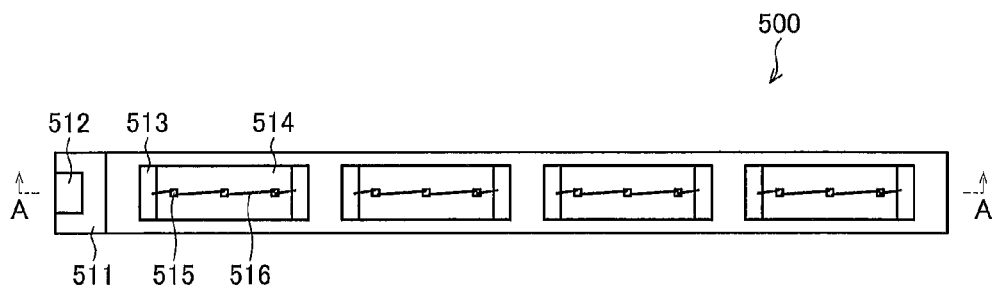
FIG. 18 illustrates another example of an LED light source substrate included in a conventional edge light-type surface light source device.
Figure 19:
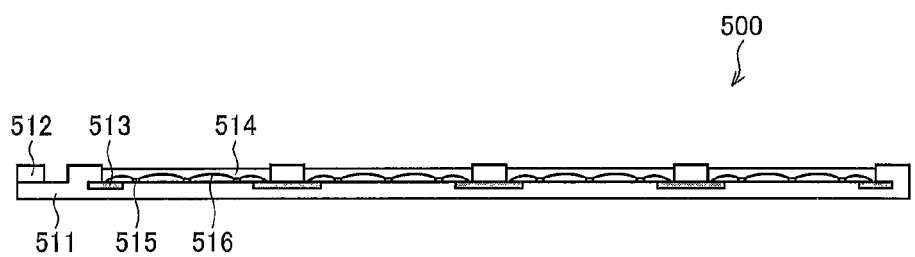
FIG. 19 is a cross-sectional view of the LED light source substrate illustrated in FIG. 18, taken along a line indicated by an arrow A-A of FIG. 18.
Figure 20:
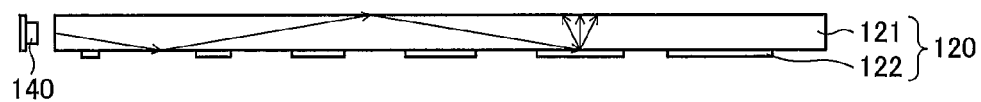
FIG. 20 is a view illustrating a pattern of reflection of light in a conventional edge light-type surface light source device.
Figure 21:
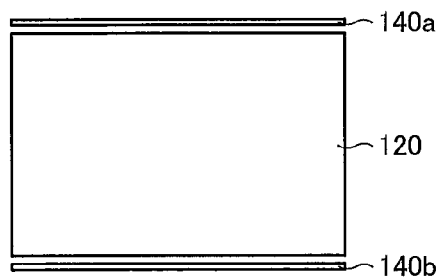
FIG. 21 schematically illustrates a positional arrangement of light source substrates in a conventional edge light-type surface light source device.
Figure 22:
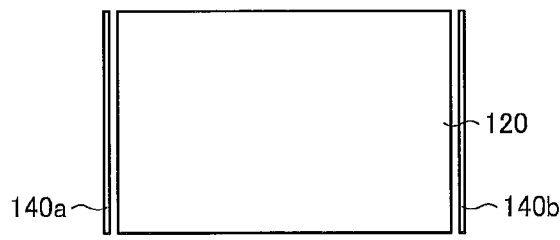
FIG. 22 schematically illustrates a positional arrangement of light source substrates in a conventional edge light-type surface light source device.
Figure 23:
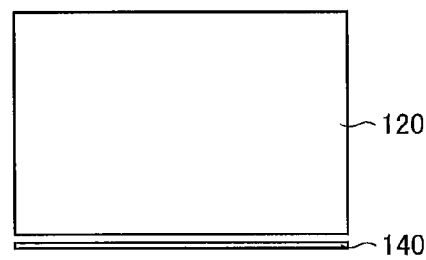
FIG. 23 schematically illustrates a positional arrangement of a light source substrate in a conventional edge light-type surface light source device.
Figure 24:
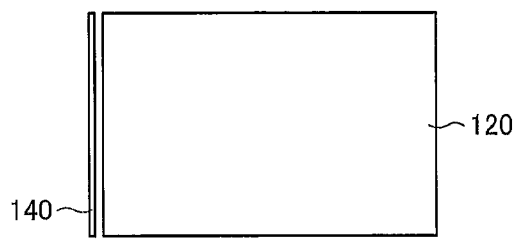
FIG. 24 schematically illustrates a positional arrangement of a light source substrate in a conventional edge light-type surface light source device.

As shown by comparison between FIGS. 9 and 15, the conventional edge light-type surface light source device has an arrangement in which an LED light source substrate is provided only at one of the short sides of the light guide plate 120, whereas the surface light source device 30 of the present embodiment has an arrangement in which an LED light source substrate is provided at each of both short sides of the light guide plate 120.

Further, the surface light source device 30 of the present embodiment includes a reflecting member 131 provided at each of both short sides of the light guide plate 120, whereas the conventional edge light-type surface light source device includes no such reflecting member.

FIG. 10 illustrates an arrangement of a reflecting sheet 130 and the reflecting member 131 included in the surface light source device 30 according to the Fifth Embodiment of the present invention.

As illustrated in FIG. 10, the reflecting member 131 is integrally formed with the reflecting sheet 130 of the surface light source device 30. Specifically, the reflecting sheet 130 includes, at each of a pair of short sides of the reflecting sheet 130, an extended portion which is extended so as to have a certain width along the each of the pair of short sides, and the extended portion serves as the reflecting member 131.

As illustrated in FIG. 10, the reflecting member 131 is bent perpendicularly at a boundary (broken line in FIG. 10) between the reflecting member 131 and the reflecting sheet 130. This allows the reflecting member 131 to cover a side surface of the light guide plate 120. As such, the width of the reflecting member 131 is set to be sufficient to cover the side surface of the light guide plate 120. Further, the boundary portion is perforated, half cut, compressed, etc. so as to be bendable easily and reliably.

In particular, the reflecting member 131 is provided at both end sections of each of the pair of short sides of the reflecting sheet 130. For example, the reflecting member 131 is made of a material having a total luminous reflectance of approximately 70% or more. Accordingly, in the surface light source device 30 of the present embodiment, it is possible to cause all corner sections of the light guide plate 120 to have an enhanced luminance by causing a side surface of each of the corner sections, which side surface is on a side of the short side of the light guide plate 120, to be covered with the reflecting member 131.

Further, the reflecting sheet 130 includes, at a central section of each of the pair of short sides, a notch 132 which is a portion where no reflecting member 131 is provided. The notch 132 is provided in order to prevent light emitted from the LED light source substrate from being blocked. As such, it is preferable that the notch 132 have a length which is at least longer than a length of a light-emitting portion of the LED light source substrate.

Note that it is possible to employ an arrangement in which no notch 132 is provided, as long as light emitted from the LED light source substrate is not blocked. For example, an arrangement in which light emitted from the LED light source substrate is not blocked can be realized by providing an opening in place of the notch 132.

Further, an arrangement in which light emitted from the LED light source substrate is not blocked can be realized without providing the notch or the opening, that is, the arrangement can be realized by (i) designing the reflecting member 131 to cover a whole of a side surface of the light guide plate 120 and (ii) disposing the LED light source substrate between the reflecting member 131 and the light guide plate 120. In this case, it is also possible to simplify an arrangement of the reflecting member 131 or reduce the number of parts of the reflecting member 131.

Further, an arrangement in which the reflecting member 131 has a reflectance lower than that of the reflecting sheet 130 can easily be realized by applying a black coating material to a surface of the reflecting member 131.

Further, although a reflectance at a given portion (in the example above, each corner section) of the light guide plate 120 is enhanced by providing the reflecting member 131 in the present embodiment, a reflectance at a given portion of the light guide plate 120 can be enhanced by other arrangements in which, for example, (i) a white coating material is applied to the side surface of the light guide plate 120, (ii) a metal having a high reflectance, such as silver, is deposited on the side surface, or (iii) the like. In these cases, a function similar to that of the reflecting member 131 can be realized easily.

Further, if necessary, it is possible to employ an arrangement in which, contrary to the example above, a reflectance at a given portion of the light guide plate 120 is reduced. For example, a reflectance at a given portion of the light guide plate 120 can be reduced by providing, applying, depositing, etc., a material having a low reflectance on the side surface of the light guide plate 120. Examples of the material encompass a material which has a total luminous reflectance of approximately 10% or less and is recognized as having a black color, such as a resin or a coating material with each of which carbon black is mixed.

FIG. 11 illustrates an arrangement of a side portion of the light guide plate 120 of the surface light source device 30 according to the Fifth Embodiment of the present invention. FIG. 11 illustrates a state in which the light guide plate 120, the reflecting sheet 130, the reflecting member 131, an LED light source substrate 140a, and an LED light source substrate 140b are combined with each other.

In FIG. 11, each of the LED light source substrate 140a and the LED light source substrate 140b includes a reflecting sheet fixing member 630 in addition to a wiring board 610 and an LED package 620. The reflecting sheet fixing member 630 is a member which protrudes from the wiring board 610 toward the light guide plate 120, and presses the reflecting member 131 against the light guide plate 120. Accordingly, in the surface light source device of the present embodiment, it is not necessary to provide separately a member for fixing the reflecting member 131. This makes it easy to fix the reflecting member 131.

Note that the reflecting sheet fixing member 630 can be integrally formed with the wiring board 610. In particular, in the present embodiment, an LED element can be mounted on the wiring board by COB, instead of using the LED package in each of the LED light source substrate 140a and the LED light source substrate 140b. This enables easy formation of the wiring board and the reflecting sheet fixing member integrally by injection molding the wiring board.

Sixth Embodiment

Figure 12:
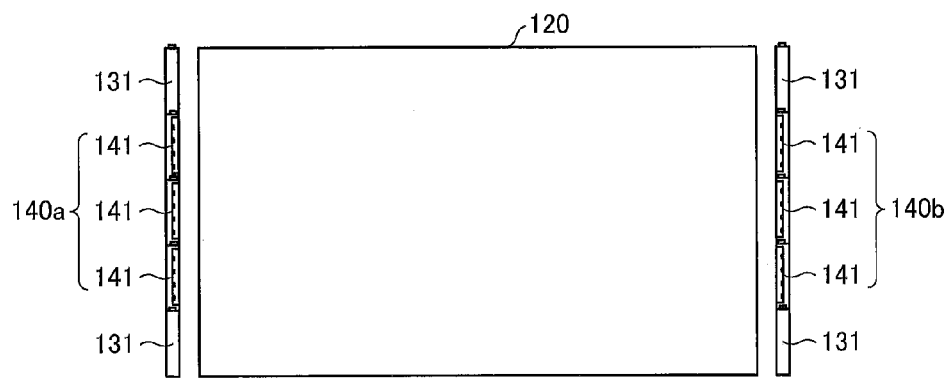
FIG. 12 illustrates an arrangement of a side portion of a light guide plate in a surface light source device according to a Sixth Embodiment of the present invention.

Next, the following description will discuss, with reference to FIG. 12, a Sixth Embodiment of the present invention. The present embodiment will show an example case in which an LED light source substrate 140 is constituted by a plurality of small substrates 141 connected to each other.

FIG. 12 illustrates arrangements of side portions of a light guide plate 120 in the surface light source device 30 according to the Sixth Embodiment of the present invention. FIG. 12 concretely illustrates an arrangement of a part of a surface light source device 30 of the Second Embodiment, and shows a state in which the light guide plate 120, a reflecting sheet 130, a reflecting member 131, an LED light source substrate 140a, and an LED light source substrate 140b are combined with each other.

In FIG. 12, the LED light source substrate 140a and the LED light source substrate 140b are each constituted by a plurality of (in the present example, three) small substrates 141 which are connected to one another. The plurality of small substrates 141 are connectable to one another mechanically and electrically, and can be treated as an equivalent to a single light source substrate when the plurality of small substrates 141 are connected to one another. Further, the reflecting member 131 can also be connected structurally to each of the plurality of small substrates 141.

An arrangement of a portion where the plurality of small substrates 141 are connected to one another or the reflecting member 131 is connected to a small substrate 141 can be any publically-known arrangement. For example, it is possible to employ an arrangement in which a convex section of one member and a concave section of another member are fitted together, so that the one member and the another member are connected to each other.

As described above, in the surface light source device 30 of the present embodiment, the reflecting member 131 is connected to each of both ends of each of the LED light source substrate 140a and the LED light source substrate 140b. This enables adjustment of a reflectance of a portion of a side surface of the light guide plate 120 in which portion no LED light source substrate is provided. This allows the surface light source device 30 of the present embodiment to bring about an effect similar to that of the surface light source device 30 of the Fifth Embodiment. In particular, since the surface light source device 30 of the present embodiment employs the reflecting member 131 which is detachable, the reflectance can easily be changed.

Although the example above is an example in which the reflecting member 131 is integrally formed with the reflecting sheet 130, the reflecting member 131 is not limited to such an arrangement. That is, the reflecting member 131 can be provided as a single member. In this case, a position of the reflecting member 131 can be fixed by bonding the reflecting member 131 to the light guide plate 120 with use of an adhesive section such as an adhesive or a tape.

Seventh Embodiment

Figure 13:
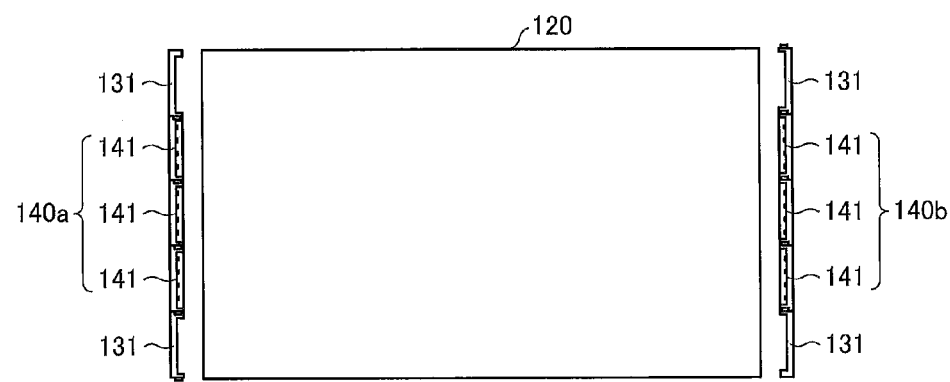
FIG. 13 illustrates an arrangement of a side portion of a light guide plate in a surface light source device according to a Seventh Embodiment of the present invention.
Figure 14:
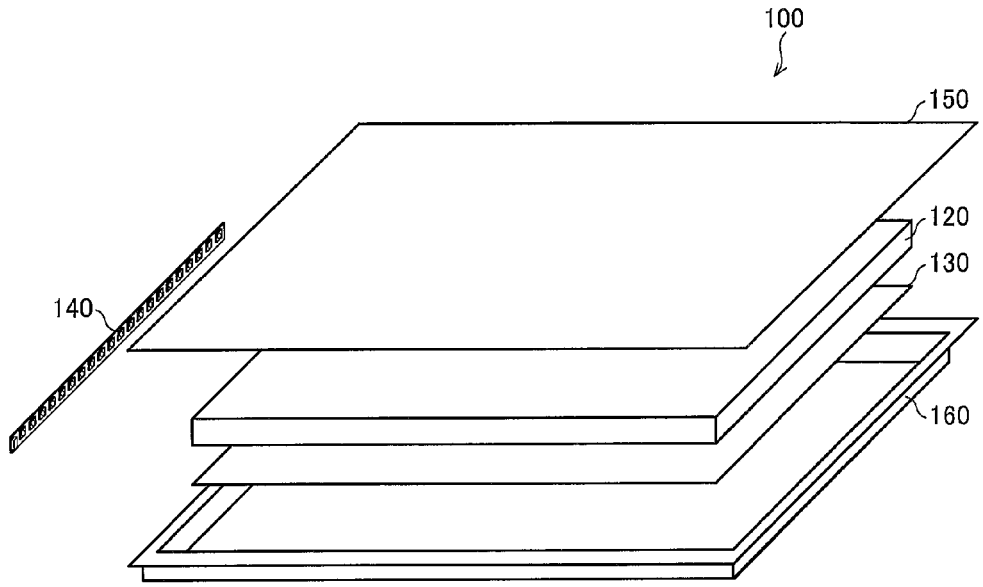
FIG. 14 is an exploded perspective view illustrating an arrangement of a conventional edge light-type surface light source device.

Next, the following description will discuss, with reference to FIG. 13, a Seventh Embodiment of the present invention. FIG. 13 illustrates arrangements of side portions of a light guide plate 120 in a surface light source device 30 according to the Seventh Embodiment of the present invention.

In the present embodiment, a reflecting member 131 has a shape different from that of the reflecting member of the Sixth Embodiment. Specifically, in the present embodiment, substrate sections of small substrates 141 are used as the reflecting member 131.

This allows the reflecting member 131 of the present embodiment to use the substrate sections of the small substrates 141 as they are, so that the reflecting member 131 is connectable similarly as each of the small substrates 141. Accordingly, the reflecting member 131 of the present embodiment can ensure similar degrees of performance and reliability as those of the small substrates 141, in terms of structure and strength. Further, since it is not necessary to use a dedicated part for the reflecting member 131, a reduction in cost related to the reflecting member 131 can be achieved.

In particular, the substrate sections of the small substrates 141 are each made of a material having a high reflectance for the sake of effective use of light. This allows the substrate sections to be used as they are, as a reflecting member 131 having a high reflectance, without requiring a particular processing of the substrate sections.

[Supplementary Explanation]

Although an LED light source substrate is used as a light source in each of the embodiments described above, the present invention is not limited to such an arrangement. However, as described as an example in each of the embodiments, the use of the LED light source substrate as the light source makes it possible to obtain an equivalent luminance with use of a shorter light source substrate.

In particular, in a case where the LED light source substrate is used as the light source, a luminance at a given portion of the light guide plate 120 can be easily adjusted by adjusting the number of LED elements or an arrangement (positions or an interval) of the LED elements. For example, a luminance of an end section of a short side of the light guide plate 120 can easily be enhanced by designing an interval between LED elements at the end section to be short.

Further, with regard to how to mount the LED elements on the LED light source substrate in each of the embodiments, it is possible to use LED packages but it is more preferable to mount the LED elements on the LED light source substrate by COB for the following reasons. (1) With a method of mounting LED packages on a wiring board, a certain length is required for each package and soldering of the package, so that the number of LED elements that can be mounted per an equal length is small. In order to mount a larger number of LED elements in high density, COB mounting is suitable. (2) In COB mounting, it is possible to use no solder. This eliminates limitations arising from soldering temperature, so that more electric power can be used. That is, since an increase in temperature is acceptable, a greater electric current can be passed. Accordingly, an improvement in luminance can be achieved by use of the same LED element. (3) In a case where a substrate for COB is prepared by injection molding, it is possible to realize easily an arrangement in which sections are connectable to one another, as described in the Sixth Embodiment and the Seventh Embodiment.

Eighth Embodiment

Figure 26:
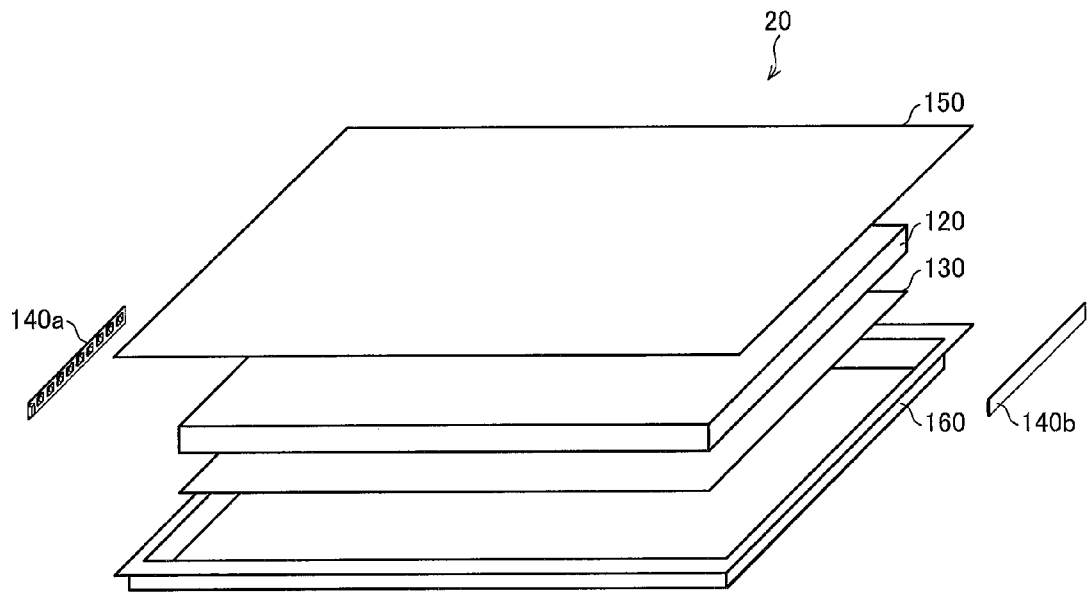
FIG. 26 is an exploded perspective view illustrating an arrangement of a part of an illumination device according to an Eighth Embodiment of the present invention.
Figure 27:
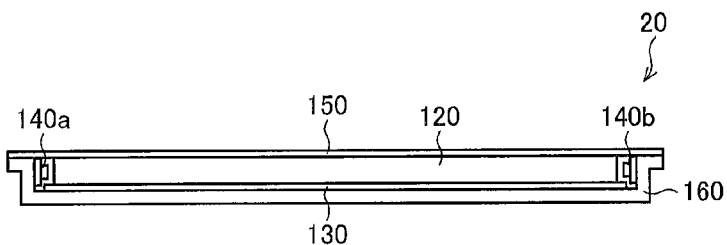
FIG. 27 is a cross-sectional view illustrating the part of the illumination device illustrated in FIG. 26, in a state where the illumination device is assembled.

Next, the following description will discuss, with reference to FIGS. 26 and 27, an Eighth Embodiment of the present invention. FIG. 26 is an exploded perspective view illustrating an arrangement of a part of an illumination device 20 according to the Eighth Embodiment of the present invention. FIG. 27 is a cross-sectional view illustrating the part of the illumination device 20 illustrated in FIG. 26, in a state where the illumination device 20 is assembled. FIGS. 26 and 27 each illustrate a part related to an optical arrangement of the illumination device 20, but the actual illumination device further requires a power supply section, a drive section for driving an LED light source substrate, a storage section for storing the power supply section and the drive section, and the like. Like the conventional LED light source device 100, the illumination device 20 includes a housing 160, a light guide plate 120, a reflecting sheet 130, and a diffusing sheet 150. The illumination device 20 includes, as light sources, the LED light source substrate 140a and the LED light source substrate 140b. The two LED light source substrates 140a and 140b are provided respectively at a pair of opposite sides of the light guide plate 120. Further, as described above in the embodiments of the present invention, each of the LED light source substrate 140a and the LED light source substrate 140b has a length significantly shorter than a length of a side of the light guide plate 120 at which side the each of the LED light source substrate 140a and the LED light source substrate 140b is provided.

The illumination device 20 is an illumination device which is realized by use of a surface light source device as described above. As an illumination device, there is a demand, particularly in a ceiling light or the like, for a product which has a rectangular light emission shape. On the other hand, as described above with reference to various embodiments, an edge light-type surface light source device of the present invention is suitable for realizing a rectangular surface light source and has advantages, namely, a cost reduction and an improvement in productivity of a light guide plate. The present embodiment shows that an edge light-type surface light source device of the present invention is not limited to use as a light source for a liquid crystal display device but can be applied also to an illumination device. As a matter of course, an arrangement identical to that of the illumination device of the present embodiment can be applied also to a light source for a liquid crystal display device.

[Supplementary Explanation]

In general, luminance uniformity is not expected in an illumination device as much as in a light source of a liquid crystal display device. Accordingly, for example, it is possible to combine a plurality of edge light-type surface light source devices so as to constitute a single illumination device. This arrangement brings about advantageous effects, namely, an improvement of handling due to a reduction in size of a member such as a light guide plate, an improvement in light use efficiency due to a reduction in optical path length in the light guide plate, and standardization of parts between illumination devices of respective different sizes. Note that the arrangement tends to cause nonuniformity of luminance at a boundary between a plurality of adjacent edge light-type surface light source devices, but can be applied to an edge light-type surface light source device of a liquid crystal display device.

Ninth Embodiment

Figure 28:
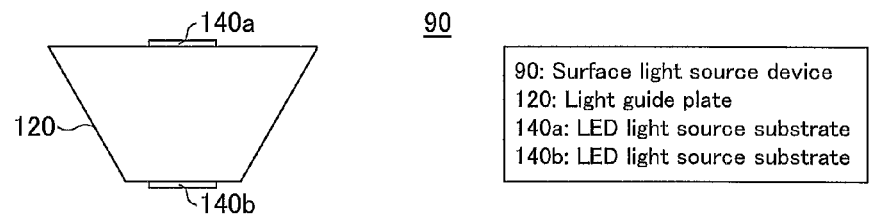
FIG. 28 schematically illustrates an arrangement of a surface light source device according to a Ninth Embodiment of the present invention.
Figure 29:
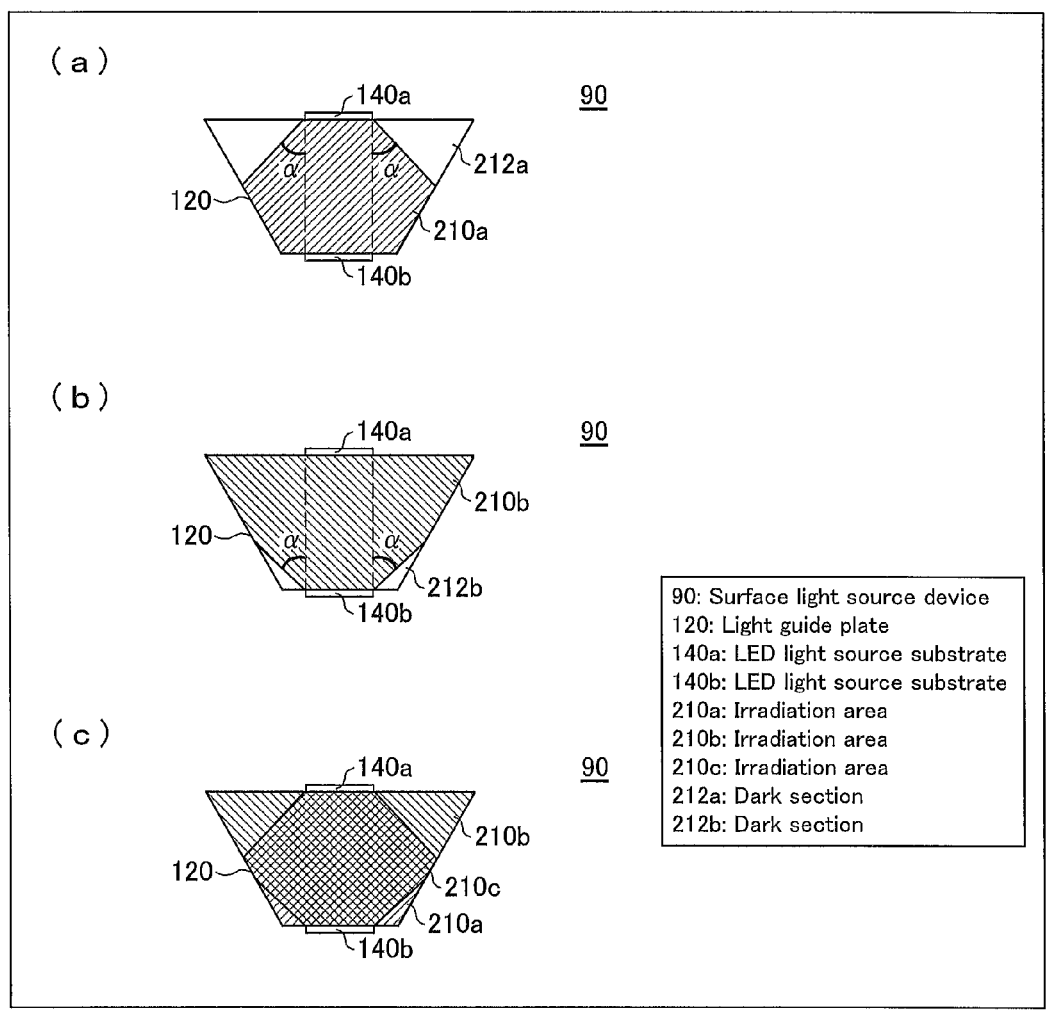
FIG. 29 illustrates irradiation areas which are irradiated with light from respective LED light source substrates in the surface light source device according to the Ninth Embodiment of the present invention.
Figure 30:
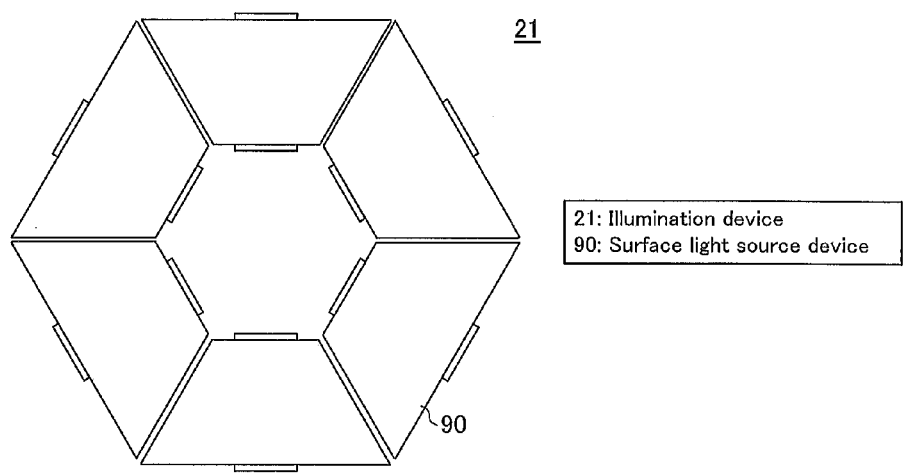
FIG. 30 schematically illustrates a positional arrangement of surface light source devices in an illumination device according to the Ninth Embodiment of the present invention.

Next, the following description will discuss, with reference to FIGS. 28 through 30, a Ninth Embodiment of the present invention.

FIG. 28 schematically illustrates an arrangement of a surface light source device 90 according to the Ninth Embodiment of the present invention. The surface light source device 50 of the Ninth Embodiment includes a light guide plate 120 which has a substantially trapezoidal shape instead of a horizontally long rectangular shape as described in the embodiments above. Except for this point, the surface light source device 90 is similar to the surface light source device 30.

Specifically, as illustrated in FIG. 28, the surface light source device 90 is arranged such that an LED light source substrate 140a and an LED light source substrate 140b are provided at respective bottom sides of the light guide plate 120 having the substantially trapezoidal shape.

FIG. 29 illustrates irradiation areas which are irradiated with light from the respective LED light source substrates in the surface light source device 90 according to the Ninth Embodiment of the present invention. Specifically, (a) of FIG. 29 shows an irradiation area 210a irradiated with light from the LED light source substrate 140a, (b) of FIG. 29 shows an irradiation area 210b irradiated with light from the LED light source substrate 140b, and (c) of FIG. 29 shows irradiation areas irradiated with light from the respective LED light source substrates 140a and 140b.

As shown in (a) of FIG. 29, in the surface light source device 90 of the present embodiment, light emitted from the LED light source substrate 140a travels toward a lower bottom of the light guide plate 120, and the irradiation area 210a irradiated with the light extends toward a right-hand side of the light guide plate 120 so as to form an angle α of refraction and toward a left-hand side of the light guide plate 120 so as to form an angle α of refraction. As a result, a dark section 212a which is not irradiated with the light from the LED light source substrate 140a is formed at an upper right corner section and an upper left corner section of the light guide plate 120.

Further, as shown in (b) of FIG. 29, in the surface light source device 90 of the present embodiment, light emitted from the LED light source substrate 140b travels toward an upper bottom of the light guide plate 120, and the irradiation area 210b irradiated with the light extends toward a right-hand side of the light guide plate 120 so as to form an angle α of refraction and toward a left-hand side of the light guide plate 120 so as to form an angle α of refraction. As a result, a dark section 212b which is not irradiated with the light from the LED light source substrate 140b is formed at a lower right corner section and a lower left corner section of the light guide plate 120.

Also in the surface light source device 90 of the present embodiment, as shown in (a) and (b) of FIG. 29, when a state where only the LED light source substrate 140a is turned on and a state where only the LED light source substrate 140b is turned on are individually considered, the dark section 212a and the dark section 212b are present in the respective states. In contrast, as shown in (c) of FIG. 29, in a state where both the LED light source substrates 140a and 140b are turned on, the dark section 212a and the dark section 212b are canceled out by the irradiation area 210b and the irradiation area 210a, respectively, in the light guide plate 120. Accordingly, an entire region of the light guide plate 120 becomes an irradiation area.

That is, although the surface light source device 90 of the present embodiment employs the LED light source substrates each including a light-emitting portion having a very small length, the special positional arrangement of the LED light source substrates as described above enables to (i) secure a sufficient irradiation area which is irradiated with light in the light guide plate 120 and (ii) realize a substantially trapezoidal light-emitting shape.

FIG. 30 schematically illustrates an arrangement of a light source of an illumination device 21 which includes a plurality of surface light source devices 90 of the present embodiment. The illumination device 21 functions as a substantially round light source by having an arrangement in which, as illustrated in FIG. 30, the plurality of (in this case, six) trapezoidal-shaped surface light source devices 90 are concentrically arranged side by side so that a short side of each of the plurality of surface light source devices 90 is located on an inner side.

[Supplementary Explanation]

As an illumination device, there is a demand, particularly in a ceiling light or the like, for a product which has a round light emission shape. As shown in the present embodiment, a round illumination device can be realized by use of an edge light-type surface light source device according to the present invention. The illumination device described above with reference to FIG. 30 is, technically speaking, an illumination device which has a substantially hexagonal light emission shape instead of a round light emission shape. However, in a case where the illumination device separately includes an optical structure such as a diffusion section, the illumination device can be regarded as practically having a round light emission shape. In the present embodiment, a substantially round light emission shape is realized with use of six surface light source devices, but it is possible to shape a light source portion rounder by dividing a round shape more finely by, for example, constituting a substantially decagonal light emission shape with use of, for example, ten trapezoidal surface light source devices.

Note that although the light guide plate 120 has a trapezoidal (polygonal) shape in the present embodiment, the light guide plate 120 can have a partially deformed trapezoidal (substantially polygonal) shape in which, for example, a part of sides is notched, a part of sides is curved, a part of angles is rounded, etc.

Tenth Embodiment

Next, the following description will discuss, with reference to FIGS. 31 through 36, a Tenth Embodiment of the present invention.

Figure 31:
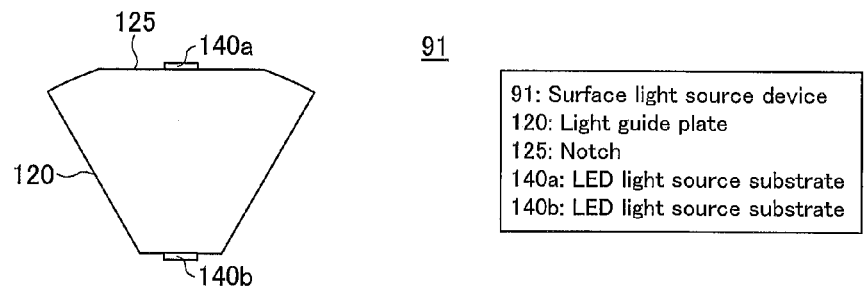
FIG. 31 schematically illustrates an arrangement of a surface light source device according to a Tenth Embodiment of the present invention.

FIG. 31 schematically illustrates an arrangement of a surface light source device 91 according to the Tenth Embodiment of the present invention. The surface light source device 91 of the Tenth Embodiment includes a light guide plate 120 which has a shape of a part of a circular shape (substantially a sector shape which is obtained by equally dividing a circular shape) instead of the substantially polygonal shape as shown in the above-described embodiments and which includes a flat notch (flat section) 125 at a part of an arc (an upper side in FIG. 31). Except for these points, the surface light source device of the Tenth Embodiment is similar to each of the surface light source devices described above.

Specifically, as illustrated in FIG. 31, the surface light source device 91 includes (i) an LED light source substrate 140a provided at the upper side of the light guide plate 120 and (ii) an LED light source substrate 140b provided at a side (a lower side in FIG. 31) which faces the upper side of the light guide plate 120. The vicinity of a portion of the light guide plate 120 where the LED light source substrate 140a is provided forms the flat section 125.

Figure 32:
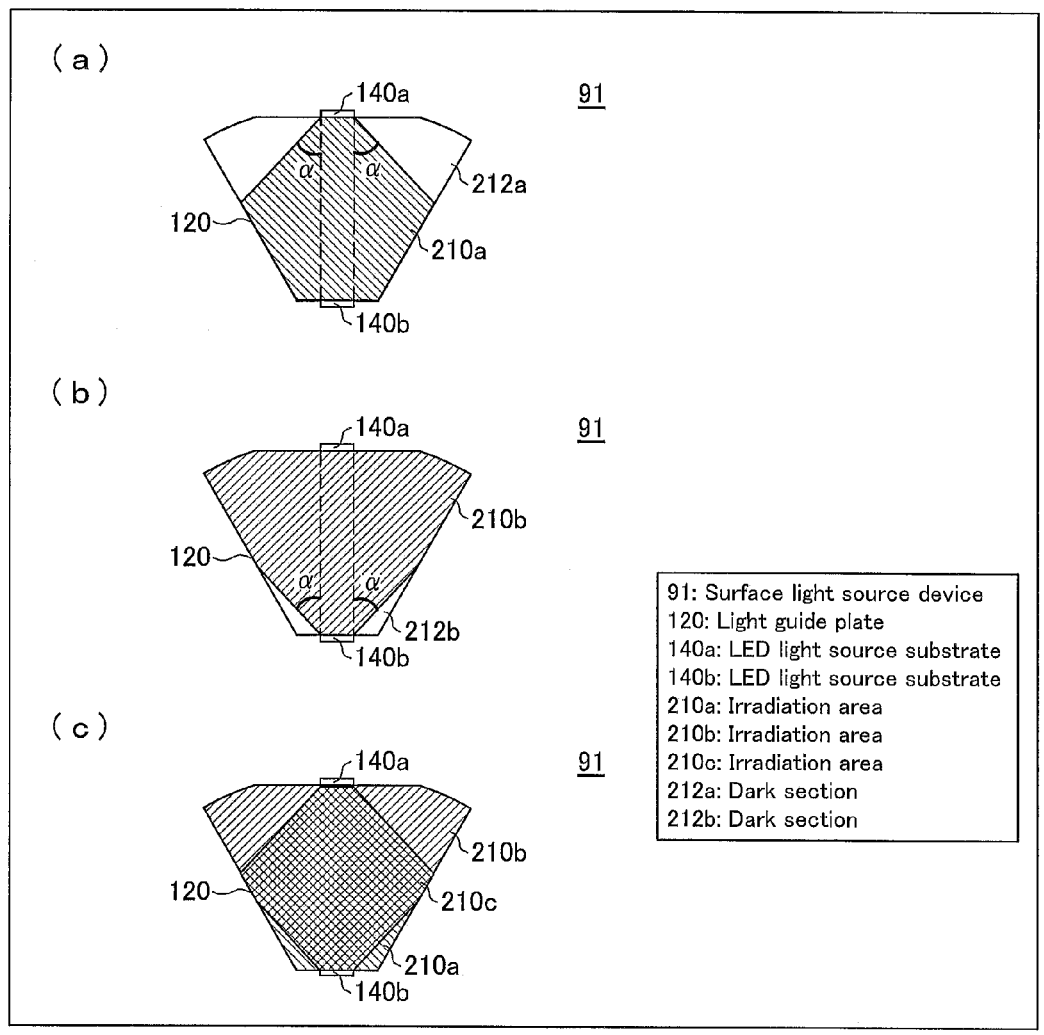
FIG. 32 illustrates irradiation areas which are irradiated with light from respective LED light source substrates in the surface light source device according to the Tenth Embodiment of the present invention.

FIG. 32 illustrates irradiation areas which are irradiated with light from the respective LED light source substrates in the surface light source device 91 according to the Tenth Embodiment of the present invention. Specifically, (a) of FIG. 32 shows an irradiation area 210a irradiated with light from the LED light source substrate 140a, (b) of FIG. 32 shows an irradiation area 210b irradiated with light from the LED light source substrate 140b, and (c) of FIG. 32 shows irradiation areas irradiated with light from the respective LED light source substrates 140a and 140b.

As shown in (a) of FIG. 32, in the surface light source device 91 of the present embodiment, light emitted from the LED light source substrate 140a travels toward the lower side of the light guide plate 120, and the irradiation area 210a irradiated with the light extends toward a right-hand side of the light guide plate 120 so as to form an angle α of refraction and toward a left-hand side of the light guide plate 120 so as to form an angle α of refraction. As a result, a dark section 212a which is not irradiated with the light from the LED light source substrate 140a is formed at an upper right corner section and an upper left corner section of the light guide plate 120.

Further, as shown in (b) of FIG. 32, in the surface light source device 91 of the present embodiment, light emitted from the LED light source substrate 140b travels toward the upper side of the light guide plate 120, and the irradiation area 210b irradiated with the light extends toward a right-hand side of the light guide plate 120 so as to form an angle α of refraction and toward a left-hand side of the light guide plate 120 so as to form an angle α of refraction. As a result, a dark section 212b which is not irradiated with the light from the LED light source substrate 140b is formed at a lower right corner section and a lower left corner section of the light guide plate 120.

Also in the surface light source device 91 of the present embodiment, as shown in (a) and (b) of FIG. 32, when a state where only the LED light source substrate 140a is turned on and a state where only the LED light source substrate 140b is turned on are individually considered, the dark section 212a and the dark section 212b are present in the respective states. In contrast, as shown in (c) of FIG. 32, in a state where both the LED light source substrates 140a and 140b are turned on, the dark section 212a and the dark section 212b are canceled out by the irradiation area 210b and the irradiation area 210a, respectively, in the light guide plate 120. Accordingly, an entire region of the light guide plate 120 becomes an irradiation area.

That is, although the surface light source device 91 of the present embodiment employs the LED light source substrates each including a light-emitting portion having a very small length, the special positional arrangement of the LED light source substrates as described above enables to (i) secure a sufficient irradiation area which is irradiated with light in the light guide plate 120 and (ii) realize a light-emitting shape which is a shape of a part of a substantially circular shape (substantially, a sector shape obtained by equally dividing a circular shape).

Figure 33:
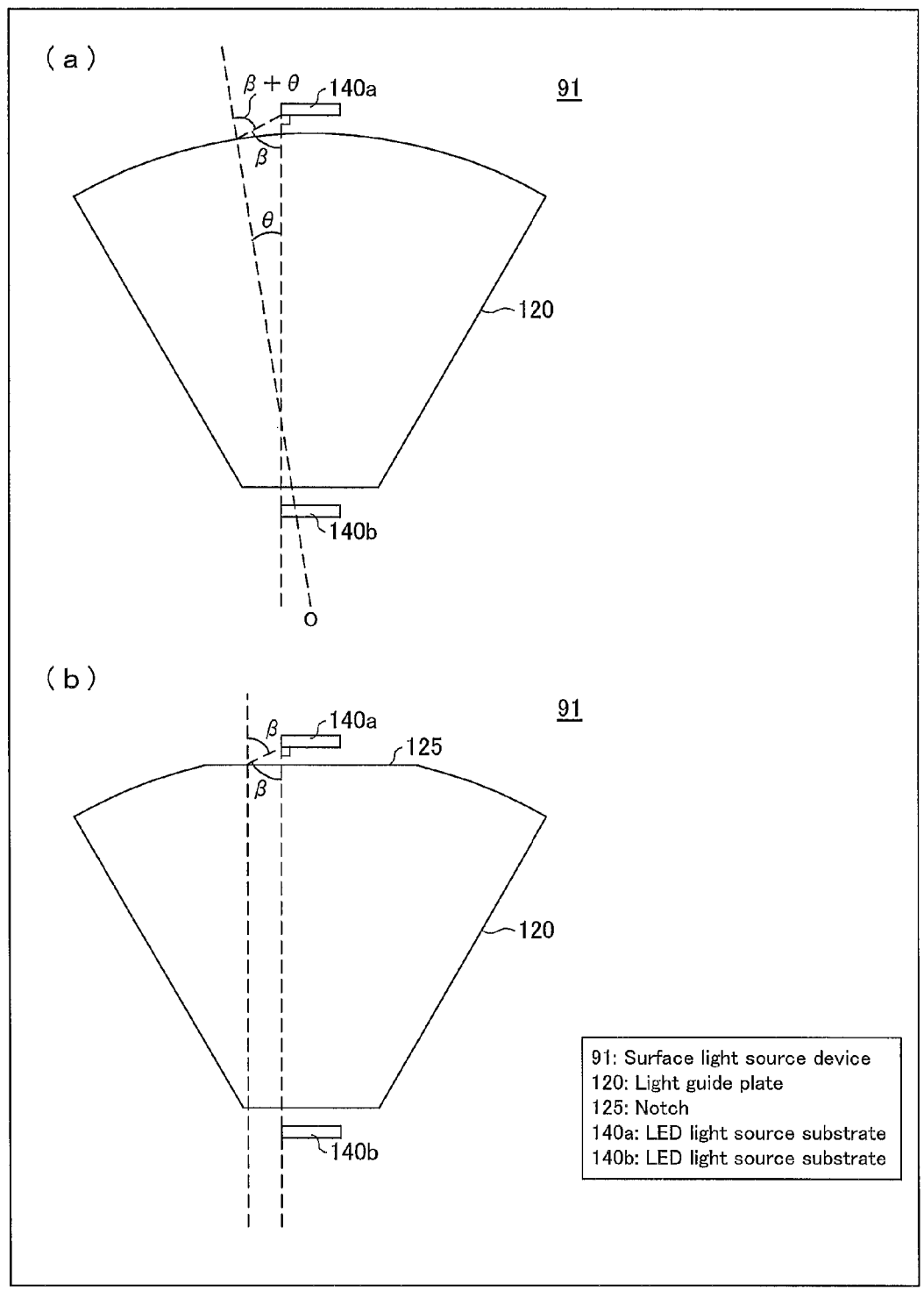
FIG. 33 is a schematic view illustrating an effect of the Tenth Embodiment of the present invention.

The following describes a feature of the surface light source device 91 of the present embodiment, with reference to schematic views of FIG. 33. (a) of FIG. 33 illustrates a shape of the surface light source device 91 in a case where a portion of the light guide plate 120 where the LED light source substrate 140a is disposed is an arc, and (b) of FIG. 33 illustrates a shape of the surface light source device 91 in a case where a part of the arc which part is the vicinity of where the LED light source substrate 140a is disposed forms the flat section 125. In reality, the light-emitting portion of the LED light source substrate is a two-dimensional surface and an incident surface of the light guide plate is a three-dimensional surface, but for easy explanation, the following description is given on the assumption that the LED light source substrate is a completely linear light source and light enters the light guide plate through a two-dimensional surface.

The light guide plate 120 has a shape of a part of a circle, and a center of the circle is a point O illustrated in (a) of FIG. 33. As illustrated in (a) of FIG. 33, when light emitted from the LED light source substrate 140a at an output angle β enters the light guide plate 120 at a certain position, an incident angle at which the light emitted from the LED light source substrate enters the light guide plate 120 is β+θ where θ is an angle formed between (i) a line connecting between the point O and the position where the light enters the light guide plate 120 and (ii) a normal line of the LED light source substrate passing through a position where the light is emitted from the LED light source substrate. On the other hand, as illustrated in (b) of FIG. 33, in a case where light emitted from the LED light source substrate 140a at an output angle β enters of the light guide plate through the flat section 125, an incident angle at which the emitted light enters the light guide plate 120 is β.

Note that an incident angle at which emitted light enters the light guide plate 120 exceeds a certain value, the light is reflected by total reflection and, accordingly, does not enter the light guide plate 120. In an arrangement illustrated in (a) of FIG. 33, the incident angle at which the emitted light enters the light guide plate 120 is greater than that in an arrangement illustrated in (b) of FIG. 33, so that more components are reflected by total reflection. Accordingly, light which is emitted from the LED light source substrate 140a and enters the light guide plate 120 is increased by the provision of the flat section 125 to the light guide plate 120 as illustrated in (b) of FIG. 33. Therefore, the surface light source device 91 can increase general light use efficiency by employing the above-described arrangement.

Figure 34:
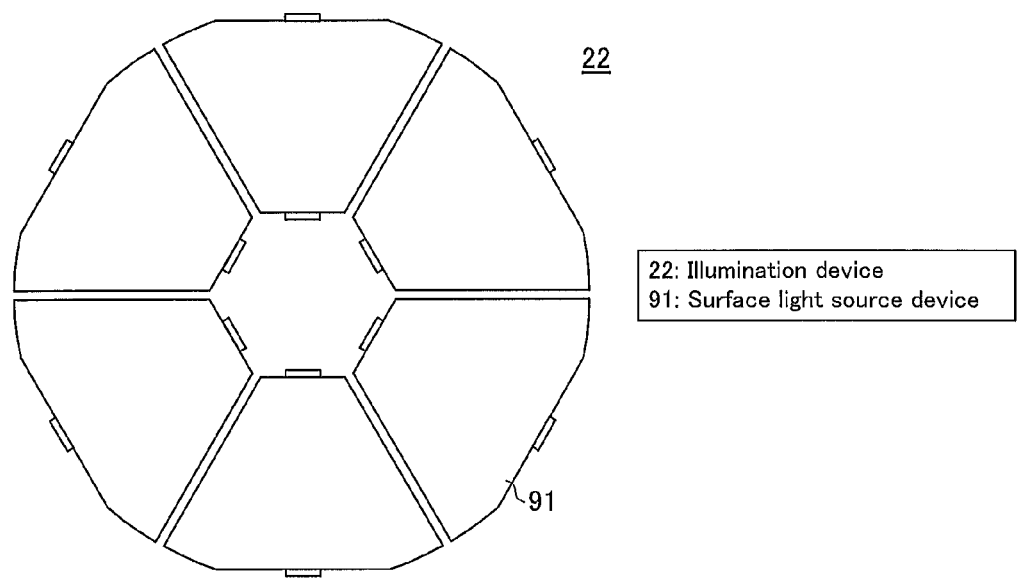
FIG. 34 schematically illustrates a positional arrangement of surface light source devices in an illumination device according to the Tenth Embodiment of the present invention.

FIG. 34 schematically illustrates an arrangement of a light source of an illumination device 22 which includes a plurality of surface light source devices 91 of the present embodiment.

Since the light guide plate 120 of each surface light source device 91 has a shape of a part of a circular shape and the circular shape is divided by six in the example illustrated in FIGS. 31 and 32, the illumination device 22 which as a whole has a round light emission shape can be realized by concentrically arranging six surface light source devices 91 side by side as illustrated in FIG. 34.

[Supplementary Explanation]

Although the light guide plate 120 of the surface light source device 91 of the present embodiment has a shape in which the flat notch 125 is provided at an arc portion, the present invention can bring about a similar effect by use of a different shape.

Figure 35:
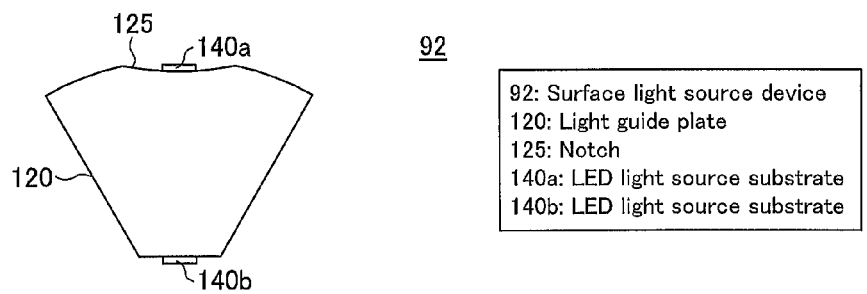
FIG. 35 schematically illustrates an arrangement of a surface light source device according to the Tenth Embodiment of the present invention.
Figure 36:
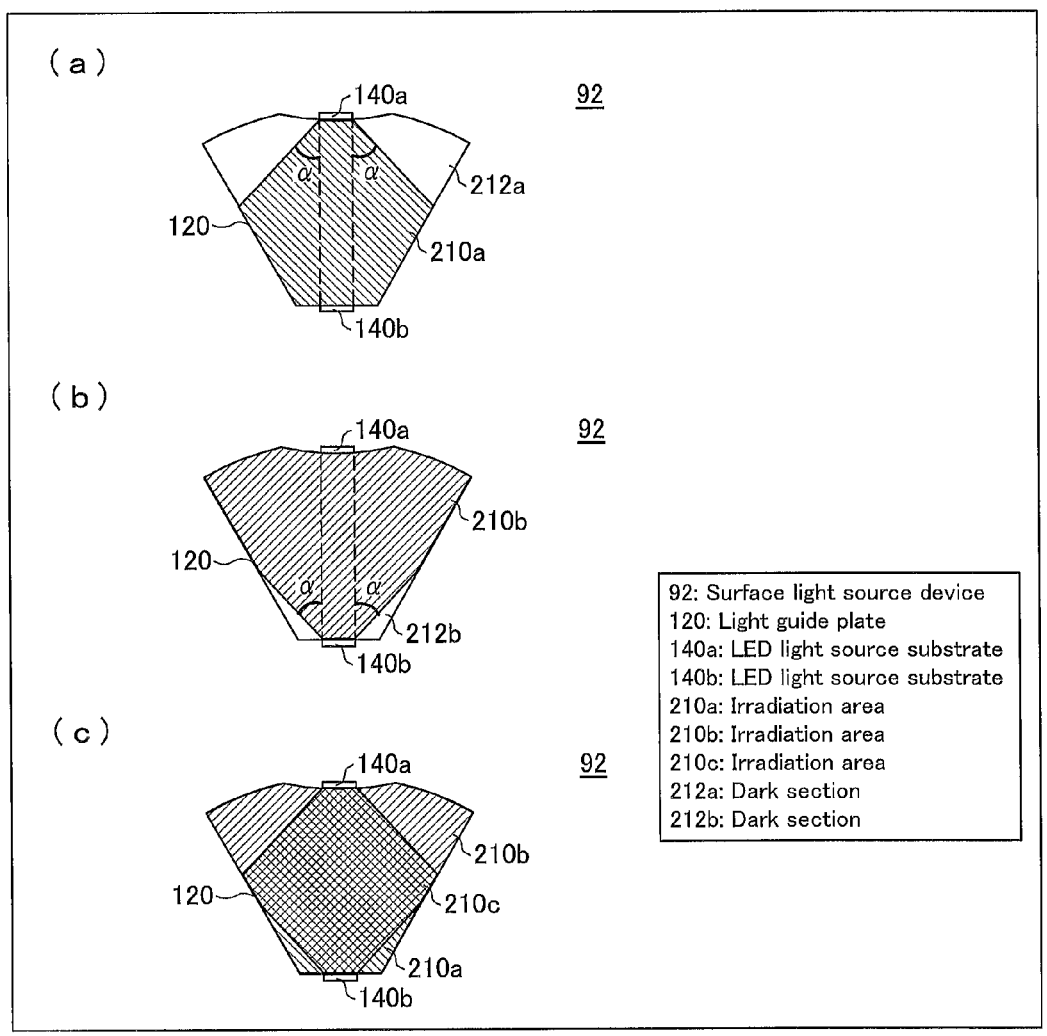
FIG. 36 illustrates irradiation areas which are irradiated with light from respective LED light source substrates in the surface light source device according to the Tenth Embodiment of the present invention.

For example, the following describes, with reference to FIGS. 35 and 36, a case in which a concave notch 125 is provided in place of the flat notch 125.

FIG. 35 schematically illustrates a surface light source device 92, which is a modified example of the surface light source device 91 of the Tenth Embodiment of the present invention. Unlike the surface light source device 91, the surface light source device 92 has the concave notch 125, instead of a flat notch, on an arc of the light guide plate 120. Except for this point, the surface light source device 92 is similar to the surface light source device 91.

FIG. 36 illustrates irradiation areas irradiated with light from the respective LED light source substrates in the surface light source device 92 according to the Tenth Embodiment of the present invention. This behavior is similar to that observed in the surface light source device 91.

An arrangement of the surface light source device 92 provides an effect and a mechanism similar to those described above with reference to FIG. 33 in relation to the surface light source device 91. Due to the concave shape of the notch 125 of the light guide plate 120, an incident angle at which light emitted from the LED light source substrate 140a enters the light guide plate 120 can be reduced further as compared with the case of the surface light source device 91. Accordingly, by employing the above-described arrangement, the surface light source device 92 can have a further improvement in light use efficiency.

In the illumination device 22 according to the present embodiment, a light source portion can be designed to have a rounder shape as compared with the illumination device 21 described in the Ninth Embodiment. Therefore, the illumination device 22 according to the present embodiment is suitable for realizing an illumination device having a round light emission shape.

Note that in the present embodiment, the light guide plate 120 has a shape of a part of a substantially circular shape (substantially a sector shape which is obtained by equally dividing a circular shape), but the light guide plate 120 can have a shape which is a part of a substantially oval shape and includes a flat or concave notch 125 at an arc section.

[Conclusion]

As described above, an edge light-type surface light source device (surface light source devices 10, 30, 50, and 70) according to the present embodiment is an edge light-type surface light source device, including: a light guide section; and a plurality of light sources each emitting light into the light guide section through a side surface of the light guide section (light guide plate 120), the plurality of light sources (LED light source substrates 140a and 140b) (i) being provided at a pair of sides of the light guide section, the pair of sides facing each other and (ii) including respective light-emitting portions, the longest one of which has a length shorter than a length of each of the pair of sides at which the plurality of light sources are provided.

According to the arrangement above, even though a light source having a short length is employed as each of the plurality of light sources, the positional arrangement described above of the plurality of light sources makes it possible to secure a sufficient irradiation area which is irradiated with light from the plurality of light sources.

The edge light-type surface light source device according to the present embodiment is preferably arranged such that the light-emitting portion of each of the plurality of light sources has a length not more than 0.8 times the length of each of the pair of sides at which the plurality of light sources are provided.

According to the arrangement above, (i) the light-emitting portion of each of the plurality of light sources can have a length (not more than 0.8 times) which is conventionally impossible to achieve without extending a length of a long side of the light guide section and (ii) a sufficient irradiation area which is irradiated with light from the plurality of light sources can be secured without extending the length of the long side of the light guide section.

Further, an edge light-type surface light source device (surface light source devices 10, 30, 50, and 70) according to the present embodiment is an edge light-type surface light source device including: a light guide section (light guide plate 120); and a plurality of light sources (LED light source substrates 140a and 140b) each emitting light into the light guide section through a side surface of the light guide section, the plurality of light sources (i) being provided at a pair of sides of the light guide section, the pair of sides facing each other and (ii) including respective light-emitting portions, a total of lengths of the respective light-emitting portions being shorter than a length of each of the pair of sides at which the plurality of light sources are provided.

According to the arrangement above, (i) the light-emitting portion of each of the plurality of light sources can have a very short length which is conventionally impossible to achieve and (ii) a sufficient irradiation area which is irradiated with the plurality of light sources can be secured.

The edge light-type surface light source device according to the present embodiment is preferably arranged to satisfy the following formula:

$$L+(N-1)x/\sqrt{(\lambda^2-1)} \geq y$$

where N is the number of the plurality of light sources, y is the length of each of the pair of sides of the light guide section, x is a length of another side of the light guide section, λ is a refractive index of the light guide section, and L is a sum total of lengths of the respective light-emitting portions of the plurality of light sources.

In particular, the edge light-type surface light source device according to the present embodiment is preferably arranged such that the number of the plurality of light sources is two; and the edge light-type surface light source device satisfies the following formula:

$$L+x/\sqrt{(\lambda^2-1)} \geq y$$

where y is the length of each of the pair of sides of the light guide section, x is the length of the another side of the light guide section, λ is the refractive index of the light guide section, and L is the sum total of the lengths of the respective light-emitting portions of the plurality of light sources.

According to the arrangement above, light emitted from the plurality of light sources can spread all over an entire surface of the light guide section.

Further, the edge light-type surface light source device according to the present embodiment is preferably arranged such that the pair of sides are short sides of the light guide section.

According to the arrangement above, a length of a line which is normal to each of the plurality of light sources and along which light emitted from the each of the plurality of light sources travels is increased as compared with a case where the plurality of light sources are provided at long sides of the light guide section. Accordingly, an irradiation area which is irradiated with the light inevitably extends further. This makes it possible to secure a sufficient irradiation area which is irradiated with the plurality of light sources, while using a light source having short size as each of the plurality of light sources and.

Further, the edge light-type surface light source device according to the present embodiment is preferably arranged such that at least a part of the plurality of light sources is provided at or in the vicinity of an end section of a corresponding side of the light guide section.

According to the arrangement above, two corner sections among the four corner sections of the light guide section are located in a normal line direction of a light source which is provided at or in the vicinity of an end section. This allows a greater number of corner sections of the light guide section to be contained in an irradiation area and, accordingly, enhance a luminance of the corner section.

Further, the edge light-type surface light source device according to the present embodiment is preferably arranged such that at least a part of the plurality of light sources is provided at a position which is distant from an end section of a corresponding side of the light guide section or from the vicinity of the end section.

According to the arrangement above, an irradiation area which is irradiated with light from the at least part of the plurality of light sources extends not only in a normal line direction of the at least part of the plurality of light sources, along which normal line direction the light travels, but also in both directions which perpendicularly intersect with the normal line direction (for example, in a case where a light source is provided at a central section of a lower side, an irradiation area irradiated with light from the light source extends not only upward but also rightward and leftward). Accordingly, the irradiation area which is irradiated with the light from the light source inevitably extends further. Accordingly, although a light source having a short length is employed as each of the plurality of light sources, it is possible to secure a sufficient irradiation area which is irradiated with the plurality of light sources.

Further, the edge light-type surface light source device according to the present embodiment is preferably arranged such that the plurality of light sources are a first light source and a second light source; the first light source is provided at a central section of a first side out of the pair of sides; and the second light source is provided at a central section of a second side out of the pair of sides.

The arrangement above makes it possible to form, on the light guide plate, irradiation patterns which are vertically and horizontally symmetric to each other and therefore look natural to a viewer.

Further, the edge light-type surface light source device according to the present embodiment is preferably arranged such that at least a part of the plurality of light sources has a length substantially equal to a length of each of the other one(s) of the plurality of light sources.

According to the arrangement above, the same light source can be used in a plurality of places, that is, light sources can be standardized. This enables a reduction in cost related to the plurality of light sources.

Further, the edge light-type surface light source device according to the present embodiment is preferably arranged such that at least a part of the plurality of light sources is constituted by a plurality of light source substrates which are connected to each other.

Further, the edge light-type surface light source device according to the present embodiment is preferably arranged such that at least a part of the plurality of light sources includes a substrate having a length different from a length of a substrate of each of the other one(s) of the plurality of light sources and is constituted by a plurality of light source substrates which are connected to each other; and at least partial ones of the plurality of light source substrates have an identical length.

According to the arrangement above, by connecting a given number of common light source substrates to each other, it is possible to (i) provide easily a linear light source having a desired length and (ii) provide easily light sources having an identical length or respective different lengths. This enables a reduction in cost related to the plurality of light sources.

Further, the edge light-type surface light source device according to the present embodiment is preferably arranged such that the light guide section includes a reflectance adjustment member (reflecting sheet 130) in at least a part of a portion of the side surface of the light guide section at which portion none of the plurality of light sources is provided, the reflectance adjustment member adjusting a reflectance of light at the portion.

The arrangement above makes it possible to adjust easily a light intensity distribution of the light guide section.

Further, the edge light-type surface light source device according to the present embodiment is preferably arranged such that the reflectance adjustment member has a total luminance reflectance of 70% or more.

This arrangement makes it possible to increase sufficiently a luminance of the light guide section in the vicinity of the reflectance adjustment member.

Further, the edge light-type surface light source device according to the present embodiment is preferably arranged such that the reflectance adjustment member has a total luminance reflectance of not more than 10%.

This arrangement makes it possible to decrease sufficiently a luminance of the light guide section in the vicinity of the reflectance adjustment member.

Further, the edge light-type surface light source device according to the present embodiment is preferably arranged such that the reflectance adjustment member is obtained by applying a coating material to the side surface of the light guide section.

Or alternatively, the edge light-type surface light source device according to the present embodiment is preferably arranged such that the reflectance adjustment member is obtained by depositing a metal on the side surface of the light guide section.

Or alternatively, the edge light-type surface light source device according to the present embodiment is preferably arranged such that the reflectance adjustment member is constituted by a reflection adjustment member (reflecting member 131) provided at the side surface of the light guide section.

The arrangement above allows the reflectance adjustment member at the side surface of the light guide section to be formed easily.

Further, the edge light-type surface light source device according to the present embodiment is preferably arranged such that the reflection adjustment member is fixed to the light guide section.

The arrangement above allows the reflection adjustment member to be provided stably to the side surface of the light guide section.

Further, the edge light-type surface light source device according to the present embodiment is preferably arranged such that the reflection adjustment member includes an opening or a notch (notch 132) in a part of the reflection adjustment member; and light emitted from each of the plurality of light sources passes through the opening or the notch and then enters the light guide section.

According to the arrangement above, light emitted from each of the plurality of light sources is not prevented from entering the light guide section. This enables adjustment of a light intensity distribution of the light guide section. In particular, by designing the opening or the notch to have a shape substantially identical to an outer shape of the each of the plurality of light sources, positioning of the reflection adjustment member is facilitated.

Further, the edge light-type surface light source device according to the present embodiment is preferably arranged such that the reflection adjustment member is formed integrally with a reflecting sheet provided on a rear surface side of the light guide section.

The arrangement above eliminates the need to prepare a special part as the reflectance adjustment member, so that a reduction in cost related to the reflectance adjustment member is achieved. Further, the arrangement allows the reflecting sheet and the reflectance adjustment member to be handled as a single body, so that assembly of the reflecting sheet and the reflectance adjustment member is facilitated.

Further, the edge light-type surface light source device according to the present embodiment is preferably arranged such that each of the plurality of light sources includes a mechanism which fixes a part of the reflection adjustment member.

The arrangement above eliminates the need to prepare a special part for fixing the reflection adjustment member, so that (i) fixation of the reflection adjustment member is facilitated and (ii) a reduction in cost related to the fixation of the reflection adjustment member is achieved.

Further, the edge light-type surface light source device according to the present embodiment is preferably arranged such that the reflection adjustment member is connectable to each of the plurality of light sources.

The arrangement allows each of the plurality of light sources and the reflection adjustment member to be handled as a single body, so that assembly of the each of the plurality of light sources and the reflection adjustment member is facilitated. Further, the arrangement facilitates replacement of the reflection adjustment member and, accordingly, allows the reflectance to be changed easily.

Further, the edge light-type surface light source device according to the present embodiment is preferably arranged such that the reflection adjustment member includes a component which is common to the plurality of light sources.

The arrangement above makes it possible to ensure similar degrees of performance and reliability of the reflection adjustment member as those of each of the plurality of light sources, in terms of structure and strength. Further, since the arrangement eliminates the need to use a dedicated part for the reflection adjustment member, a reduction in cost related to the reflection adjustment member is achieved.

Further, the edge light-type surface light source device according to the present embodiment is preferably arranged such that the light guide section has a point symmetric shape; light emitted from the respective plurality of light sources has a substantially identical luminance; and the plurality of light sources are arranged point symmetric to each other with respect to the light guide section.

The arrangement above makes it possible to form, on the light guide plate, irradiation patterns which are symmetric to each other and therefore look natural to a viewer. In particular, according to the arrangement, a region which cannot be made an irradiation area by means of one light source can easily be made an irradiation area by means of the other light source. This enables to secure a sufficient irradiation area efficiently.

Further, the edge light-type surface light source device according to the present embodiment is preferably arranged such that each of the plurality of light sources is a light source substrate on which a plurality of light-emitting diodes are mounted.

This arrangement makes it possible to enhance an amount of light emitted from each of the plurality of light sources per unit length and accordingly, reduce a length of the light source substrate.

Further, the edge light-type surface light source device according to the present embodiment is preferably arranged such that the plurality of light-emitting diodes are mounted on the light source substrate at an uneven pitch.

The arrangement above allows an amount of light emitted from each of the plurality of light sources to be adjusted on a section by section basis of the each of the plurality of light sources, so that an amount of light emission can be controlled more finely.

Further, the edge light-type surface light source device according to the present embodiment is preferably arranged such that the plurality of light-emitting diodes are mounted on the light source substrate by COB.

The arrangement above makes it possible to enhance further a luminance of the light source substrate per length of the light source substrate and accordingly, reduce further the length of the light source substrate.

Further, as described above, an illumination device (illumination device 20) according to the present embodiment is an illumination device including, as a light source, an edge light-type surface light source device having the arrangement described above.

According to the arrangement above, it is possible to obtain an advantage of the present invention in an illumination device which is expected to have a substantially rectangular light emission shape and a demand for which is particularly high as a ceiling light.

Further, an edge light-type surface light source device (surface light source device 90) according to the present embodiment is an edge light-type surface light source device, including: a light guide section (light guide plate 120) having a substantially polygonal shape which is not a rectangular shape; and a plurality of light sources (LED light source substrates 140*a* and 140*b*) each emitting light into the light guide section through a side surface of the light guide section, the plurality of light sources (i) being provided at a pair of sides of the light guide section, the pair of sides not being adjacent to each other and (ii) including respective light-emitting portions, the longest one of which has a length shorter than a length of each of the pair of sides at which the plurality of light sources are provided.

The arrangement above makes it possible to obtain an advantageous effect of the present invention by use of light sources each having a light emission shape which is not a substantially rectangular shape.

Further, an illumination device (illumination device 21) according to the present embodiment is an illumination device including a plurality of said edge light-type surface light source devices (surface light source devices 90) as light sources.

According to the arrangement above, it is possible to obtain an advantage of the present invention in, for example, an illumination device which is expected to have a substantially round light emission shape and a demand for which is particularly high as a ceiling light.

Further, as described above, an edge light-type surface light source device (surface light source devices 91 and 92) according to the present embodiment is an edge light-type surface light source device including: a light guide section (light guide plate 120) having a shape of a part of a substantially circular shape or a substantially oval shape; and a plurality of light sources (LED light source substrates 140*a* and 140*b*) each emitting light into the light guide section through a side surface of the light guide section, the light guide section including a flat section or a notch (notch 125) in an arc part of the substantially circular shape or the substantially oval shape, at least a part of the plurality of light sources being arranged along the flat section or the notch.

The arrangement makes it possible to make efficient use of light with use of light sources each having a light emission shape which is a shape of a part of a substantially circular shape or a substantially oval shape.

Further, an illumination device (illumination device 22) according to the present embodiment is an illumination device comprising a plurality of edge light-type surface light source devices (surface light source devices 91 and surface light source devices 92), the illumination device having a light emission shape in which the illumination device emits light in accordance with a shape of the light guide section included in each of the plurality of edge light-type surface light source devices, the plurality of edge light-type surface light source devices being arranged annularly, the light emission shape being a substantially circular shape or a substantially oval shape constituted by a plurality of said light guide sections.

According to the arrangement above, it is possible to obtain an advantage of the present invention in, for example, an illumination device which is expected to have a round or other shape of light emission and a demand for which is particularly high as a ceiling light.

[Additional Matter]

The present invention is not limited to the above-described embodiments but allows various modifications within the scope of the claims. In other words, any embodiment derived from a combination of two or more technical means appropriately modified within the scope of the claims will also be included in the technical scope of the present invention.

INDUSTRIAL APPLICABILITY

The present invention can be widely used as a surface light source device for various display devices and as an illumination device. In particular, the present invention is useful as a surface light source device and an illumination device each of which is expected to achieve reduction in space, cost, power consumption, and the like.

REFERENCE SIGNS LIST

100: LED LIGHT SOURCE DEVICE
10, 30, 50, 70, 90, 91, 92: SURFACE LIGHT SOURCE DEVICE (EDGE LIGHT-TYPE SURFACE LIGHT SOURCE DEVICE)
20, 21, 22: ILLUMINATION DEVICE
140, 140a, 140b, 140c, 500, 600: LED LIGHT SOURCE SUBSTRATE (LIGHT SOURCE)
141: SMALL SUBSTRATE
120: LIGHT GUIDE PLATE (LIGHT GUIDE SECTION)
121: LIGHT GUIDE BODY
122: REFLECTION PATTERN
125: NOTCH
130: REFLECTING SHEET (REFLECTANCE ADJUSTMENT MEMBER)
131: REFLECTING MEMBER (REFLECTION ADJUSTMENT MEMBER)
132: NOTCH
150: DIFFUSING SHEET
160: HOUSING
601: CONNECTOR
610: WIRING BOARD
611: BASE
612: WIRING LAYER
613: SOLDER RESIST LAYER
620: LED PACKAGE
621: LED ELEMENT
622: SEALING RESIN
623: BONDING WIRE
624: WIRING LAYER
625: BASE
626: SOLDER
630: REFLECTING SHEET FIXING MEMBER
511: BASE
512: CONNECTOR
513: WIRING LAYER
514: SEALING RESIN
515: LED ELEMENT
516: BONDING WIRE

The invention claimed is:

1. An edge light-type surface light source device, comprising:
   a light guide section;
   a reflectance adjustment member having an opening or a notch; and
   a plurality of light sources each emitting light into the light guide section through a side surface of the light guide section,
   the plurality of light sources (i) being provided at a pair of sides of the light guide section, the pair of sides facing each other and (ii) including respective light-emitting portions, the longest one of which has a length shorter than a length of each of the pair of sides at which the plurality of light sources are provided, the notch or the opening of the reflectance adjust member having a length which is longer than lengths of the light-emitting portions of the respective plurality of light sources,
   the edge light-type surface light source device satisfying the following formulae:

$$L+(N-1)x/\sqrt{(\lambda^2-1)} \geq y,$$

$$L < 0.8y, \text{ and}$$

$$N \geq 2$$

where N is the number of the plurality of light sources, y is the length of each of the pair of sides of the light guide section, x is a length of another side of the light guide section, $\lambda$ is a refractive index of the light guide section, and L is a sum total of lengths of the respective light-emitting portions of the plurality of light sources.

2. The edge light-type surface light source device as set forth in claim 1, wherein the pair of sides are short sides of the light guide section.

3. The edge light-type surface light source device as set forth in claim 1, wherein at least a part of the plurality of light sources is provided at or in the vicinity of an end section of a corresponding side of the light guide section.

4. The edge light-type surface light source device as set forth in claim 1, wherein at least a part of the plurality of light sources is provided at a position which is distant from an end section of a corresponding side of the light guide section or from the vicinity of the end section.

5. The edge light-type surface light source device as set forth in claim 1, wherein:
   the plurality of light sources are a first light source and a second light source;
   the first light source is provided at a central section of a first side out of the pair of sides; and
   the second light source is provided at a central section of a second side out of the pair of sides.

6. The edge light-type surface light source device as set forth in claim 1, wherein at least a part of the plurality of light sources has a length substantially equal to a length of each of the other one(s) of the plurality of light sources.

7. The edge light-type surface light source device as set forth in claim 1, wherein:
   the light guide section has a point symmetric shape;
   light emitted from the respective plurality of light sources has a substantially identical luminance; and
   the plurality of light sources are arranged point symmetric to each other with respect to the light guide section.

8. An illumination device comprising an edge light-type surface light source device recited in claim 1.

9. The edge light-type surface light source device as set forth in claim 1, wherein at least a part of the plurality of light sources is constituted by a plurality of light source substrates which are connected to each other.

10. The edge light-type surface light source device as set forth in claim 9, wherein:
at least a part of the plurality of light sources includes a substrate having a length different from a length of a substrate of each of the other one(s) of the plurality of light sources and is constituted by a plurality of light source substrates which are connected to each other; and
at least partial ones of the plurality of light source substrates have an identical length.

11. The edge light-type surface light source device as set forth in claim 1, wherein each of the plurality of light sources is a light source substrate on which a plurality of light-emitting diodes are mounted.

12. The edge light-type surface light source device as set forth in claim 11, wherein the plurality of light-emitting diodes are mounted on the light source substrate at an uneven pitch.

13. The edge light-type surface light source device as set forth in claim 11, wherein the plurality of light-emitting diodes are mounted on the light source substrate by COB.

14. The edge light-type surface light source device as set forth in claim 1, wherein the light guide section includes the reflectance adjustment member in at least a part of a portion of the side surface of the light guide section at which portion none of the plurality of light sources is provided, the reflectance adjustment member adjusting a reflectance of light at the portion.

15. The edge light-type surface light source device as set forth in claim 14, wherein the reflectance adjustment member has a total luminance reflectance of 70% or more.

16. The edge light-type surface light source device as set forth in claim 14, wherein the reflectance adjustment member has a total luminance reflectance of not more than 10%.

17. The edge light-type surface light source device as set forth in claim 14, wherein the reflectance adjustment member is obtained by applying a coating material to the side surface of the light guide section.

18. The edge light-type surface light source device as set forth in claim 14, wherein the reflectance adjustment member is obtained by depositing a metal on the side surface of the light guide section.

19. The edge light-type surface light source device as set forth in claim 14, wherein the reflectance adjustment member is constituted by a reflection adjustment member provided at the side surface of the light guide section.

20. The edge light-type surface light source device as set forth in claim 19, wherein the reflection adjustment member is fixed to the light guide section.

21. The edge light-type surface light source device as set forth in claim 19, wherein:
light emitted from each of the plurality of light sources passes through the opening or the notch and then enters the light guide section.

22. The edge light-type surface light source device as set forth in claim 19, wherein the reflection adjustment member includes a component which is common to the plurality of light sources.

23. The edge light-type surface light source device as set forth in claim 19, wherein the reflection adjustment member is formed integrally with a reflecting sheet provided on a rear surface side of the light guide section.

24. The edge light-type surface light source device as set forth in claim 23, wherein each of the plurality of light sources includes a mechanism which fixes a part of the reflection adjustment member.

25. An edge light-type surface light source device comprising:
a light guide section having a curved portion;
a reflectance adjustment member having an opening or a notch; and
a plurality of light sources each emitting light into the light guide section through a side surface of the light guide section,
the light guide section including a flat section or a notch in the curved portion,
the plurality of light sources being provided at a pair of sides of the light guide section, the pair of sides facing each other,
at least a part of the plurality of light sources being arranged along the flat section or the notch,
the notch or the opening of the reflectance adjust member having a length which is longer than lengths of the light-emitting portions of the respective plurality of light sources,
the edge light-type surface light source device satisfying the following formulae:

$$L+(N-1)x/\sqrt{(\lambda^2-1)} \geq y,$$

$$L < 0.8y, \text{ and}$$

$$N \geq 2$$

where N is the number of the plurality of light sources, y is the length of each of the pair of sides of the light guide section, x is a length of another side of the light guide section, $\lambda$ is a refractive index of the light guide section, and L is a sum total of lengths of the respective light-emitting portions of the plurality of light sources.

26. An illumination device comprising a plurality of said edge light-type surface light source devices recited in claim 25,
the illumination device having a light emission shape in which the illumination device emits light in accordance with a shape of the light guide section included in each of the plurality of edge light-type surface light source devices,
the plurality of edge light-type surface light source devices being arranged annularly,
the light emission shape being a substantially circular shape or a substantially oval shape constituted by a plurality of said light guide sections.

27. An edge light-type surface light source device, comprising:
a light guide section having a substantially polygonal shape which is not a rectangular shape;
a reflectance adjustment member having an opening or a notch; and
a plurality of light sources each emitting light into the light guide section through a side surface of the light guide section,
the plurality of light sources (i) being provided at a pair of sides of the light guide section, the pair of sides facing each other and (ii) including respective light-emitting portions, the longest one of which has a length shorter than a length of each of the pair of sides at which the plurality of light sources are provided, the notch or the opening of the reflectance adjust member having a length which is longer than lengths of the light-emitting portions of the respective plurality of light sources, the edge light-type surface light source device satisfying the following formulae:

$$L+(N-1)x/\sqrt{(\lambda^2-1)} \geq y,$$

$$L < 0.8y, \text{ and}$$

$$N \geq 2$$

where N is the number of the plurality of light sources, y is the length of each of the pair of sides of the light guide section, x is a length of another side of the light guide section, λ is a refractive index of the light guide section, and L is a sum total of lengths of the respective light-emitting portions of the plurality of light sources.

28. An illumination device comprising a plurality of said edge light-type surface light source devices recited in claim 27.

29. An edge light-type surface light source device comprising:
a light guide section;
a reflectance adjustment member having an opening or a notch; and
a plurality of light sources each emitting light into the light guide section through a side surface of the light guide section, the plurality of light sources (i) being provided at a pair of sides of the light guide section, the pair of sides facing each other and (ii) including respective light-emitting portions, a total of lengths of the respective light-emitting portions being shorter than a length of each of the pair of sides at which the plurality of light sources are provided, the notch or the opening of the reflectance adjust member having a length which is longer than lengths of the light-emitting portions of the respective plurality of light sources, the edge light-type surface light source device satisfying the following formulae:

$$L+(N-1)x/\sqrt{(\lambda^2-1)} \geq y,$$

$$L < 0.8y, \text{ and}$$

$$N \geq 2$$

where N is the number of the plurality of light sources, y is the length of each of the pair of sides of the light guide section, x is a length of another side of the light guide section, λ is a refractive index of the light guide section, and L is a sum total of lengths of the respective light-emitting portions of the plurality of light sources.

* * * * *